US012374982B2

(12) United States Patent
Lin et al.

(10) Patent No.: US 12,374,982 B2
(45) Date of Patent: Jul. 29, 2025

(54) FEEDBACK CONTROL DEVICE AND FEEDBACK CONTROL METHOD FOR DC-TO-DC CONVERTER

(71) Applicant: Novatek Microelectronics Corp., Hsinchu (TW)

(72) Inventors: Zhe Hui Lin, Hsinchu County (TW); Wei-Ling Chen, Hsinchu County (TW); Lan-Shan Cheng, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 258 days.

(21) Appl. No.: 18/193,661

(22) Filed: Mar. 31, 2023

(65) Prior Publication Data

US 2024/0333126 A1  Oct. 3, 2024

(51) Int. Cl.
*H02M 1/00* (2007.01)
*H02M 3/158* (2006.01)

(52) U.S. Cl.
CPC ......... *H02M 1/0025* (2021.05); *H02M 3/158* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30;

(Continued)

(56) References Cited

U.S. PATENT DOCUMENTS 6,583,610 B2 *  6/2003  Groom ................. H02M 3/156
323/224
7,957,847 B2 *  6/2011  Donaldson ........... H02M 3/156
323/224

(Continued)

FOREIGN PATENT DOCUMENTS

| CN | 105302215 | 2/2016 |
| TW | 200820563 | 5/2008 |
| TW | I431906 | 3/2014 |

OTHER PUBLICATIONS

"Office Action of Taiwan Counterpart Application", issued on Dec. 5, 2023, p. 1-p. 5.

*Primary Examiner* — Jeffrey A Gblende
(74) *Attorney, Agent, or Firm* — JCIPRNET

(57) ABSTRACT

The invention provides a feedback control device and a feedback control method thereof. The feedback control device includes an enhancing circuit and a comparator. The enhancing circuit receives a feedback voltage corresponding to an output voltage of a DC-to-DC converter. In an embodiment, the enhancing circuit generates an enhanced feedback voltage based on the feedback voltage, and the comparator uses a comparison result between a reference voltage and the enhanced feedback voltage as a control signal to a feedback control terminal of the DC-to-DC converter. In another embodiment, the enhancing circuit generates an enhanced reference voltage based on the reference voltage, and the comparator uses a comparison result between the enhanced reference voltage and the feedback voltage as the control signal. In yet another embodiment, the comparator uses a comparison result between the enhanced reference voltage and the enhanced feedback voltage as the control signal.

28 Claims, 22 Drawing Sheets

(58) Field of Classification Search
CPC ... G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

(56) References Cited

U.S. PATENT DOCUMENTS

| | | | | |
|---|---|---|---|---|
| 2003/0142519 A1* | 7/2003 | Walters | ............... | H02M 3/156 363/89 |
| 2011/0227547 A1* | 9/2011 | Wong | ............... | H02M 3/156 323/282 |
| 2012/0217941 A1* | 8/2012 | Chen | ............... | H02M 3/156 323/271 |

\* cited by examiner

FEEDBACK CONTROL DEVICE AND FEEDBACK CONTROL METHOD FOR DC-TO-DC CONVERTER

BACKGROUND

Technical Field

The disclosure relates to a power conversion circuit, and more particularly to a feedback control device and a feedback control method thereof.

Description of Related Art

The constant ON time (COT) control technology may be applied to DC-to-DC converters of electronic products such as mobile phones, laptops, and TVs. Compared with traditional voltage control, the control structure of COT technology is quite simple. The COT converter samples the output voltage, and then the comparator directly compares the ripple valley value of the output voltage with the reference voltage to generate a fixed turn-on time pulse to turn on the upper power switch. When the turn-on time pulse expires, the upper power switch is turned off (then the lower power switch is turned on). That is, the conduction time of the upper power switch is fixed, but the conduction time of the lower power switch is variable. Generally, COT converters require comparators with characteristics such as high gain and high bandwidth.

It should be noted that the content of the "BACKGROUND" section is used to help understand the disclosure. Some of the content (or all of the content) disclosed in the "BACKGROUND" section may not be known by those of ordinary skill in the art. The content disclosed in the "BACKGROUND" section does not mean that the content has been known to those with ordinary knowledge in the technical field before the application of the disclosure.

SUMMARY

The disclosure provides a feedback control device and a feedback control method thereof to generate a control signal to a DC-to-DC converter based on an output voltage of the DC-to-DC converter.

In an embodiment of the disclosure, the feedback control device includes an enhancing circuit and a comparator. The enhancing circuit is coupled to the DC-to-DC converter to receive a first feedback voltage corresponding to the output voltage. The enhancing circuit is configured to generate a second feedback voltage based on the first feedback voltage; and the comparator is coupled to the enhancing circuit to receive a first reference voltage and the second feedback voltage. The comparator generates a comparison result based on the first reference voltage and the second feedback voltage as the control signal to a feedback control terminal of the DC-to-DC converter. The enhancing circuit amplifies the first feedback voltage to generate the second feedback voltage; or the enhancing circuit pulls up the first feedback voltage during a transition period of the output voltage from dropping to rising to generate the second feedback voltage; or the enhancing circuit amplifies the first feedback voltage to generate an amplified voltage and pulls up the amplified voltage during the transition period of the output voltage to generate the second feedback voltage.

In an embodiment of the disclosure, the feedback control method is described below. A second feedback voltage is generated by an enhancing circuit based on a first feedback voltage corresponding to the output voltage. The comparator generates a comparison result based on the first reference voltage and the second feedback voltage as the control signal to a feedback control terminal of the DC-to-DC converter. The enhancing circuit amplifies the first feedback voltage to generate the second feedback voltage; or the enhancing circuit pulls up the first feedback voltage during a transition period of the output voltage from dropping to rising to generate the second feedback voltage; or the enhancing circuit amplifies the first feedback voltage to generate an amplified voltage and pulls up the amplified voltage during the transition period of the output voltage to generate the second feedback voltage.

In an embodiment of the disclosure, the feedback control device includes an enhancing circuit and a comparator. The enhancing circuit is coupled to the DC-to-DC converter to receive a feedback voltage corresponding to the output voltage. The enhancing circuit is configured to generate a second reference voltage based on the feedback voltage and the first reference voltage. The comparator is coupled to the enhancing circuit to receive the second reference voltage. The comparator generates a comparison result based on the second reference voltage and the feedback voltage as the control signal to a feedback control terminal of the DC-to-DC converter. The enhancing circuit filters out an alternating current component of a difference between the feedback voltage and the first reference voltage to generate a difference voltage. The difference voltage is converted into a difference current. The first reference voltage is adjusted based on the difference current to generate the second reference voltage; or the enhancing circuit pulls down the first reference voltage during a transition period of the output voltage from dropping to rising to generate the second reference voltage; or the enhancing circuit filters out an alternating current component of a difference between the feedback voltage and the first reference voltage to generate a difference voltage. The difference voltage is converted into the difference current. The first reference voltage is adjusted based on the difference current to generate the second reference voltage, and the second reference voltage is pulled down during the transition period of the output voltage.

In an embodiment of the disclosure, the feedback control method is described below. A second reference voltage is generated by an enhancing circuit based on a first reference voltage and a feedback voltage corresponding to the output voltage. The comparator generates a comparison result based on the second reference voltage and the feedback voltage as the control signal to a feedback control terminal of the DC-to-DC converter. The enhancing circuit filters out an alternating current component of a difference between the feedback voltage and the first reference voltage to generate a difference voltage. The difference voltage is converted into a difference current. The first reference voltage is adjusted based on the difference current to generate the second reference voltage; or the enhancing circuit pulls down the first reference voltage during a transition period of the output voltage from dropping to rising to generate the second reference voltage; or the enhancing circuit filters out an alternating current component of a difference between the feedback voltage and the first reference voltage to generate a difference voltage. The difference voltage is converted into the difference current. The first reference voltage is adjusted based on the difference current to generate the second reference voltage, and the second reference voltage is pulled down during the transition period of the output voltage.

Based on the above, the enhancing circuit described in various embodiments of the disclosure is capable of: generating an enhanced reference voltage to the comparator based on an original reference voltage (while providing an original feedback voltage of the DC-to-DC converter to the comparator); or generating an enhanced feedback voltage to the comparator based on the original feedback voltage (while providing the original reference voltage to the comparator); or generating the enhanced feedback voltage and the enhanced reference voltage to the comparator based on the original feedback voltage and the original reference voltage. The feedback control device may first adjust the front-end signal (the original reference voltage and/or the original feedback voltage) to reduce the characteristics requirements for the comparator (high gain and high bandwidth).

In order to make the above-mentioned features and advantages of the disclosure comprehensible, embodiments accompanied with drawings are described in detail below.

DESCRIPTION OF THE EMBODIMENTS

Figure 1:
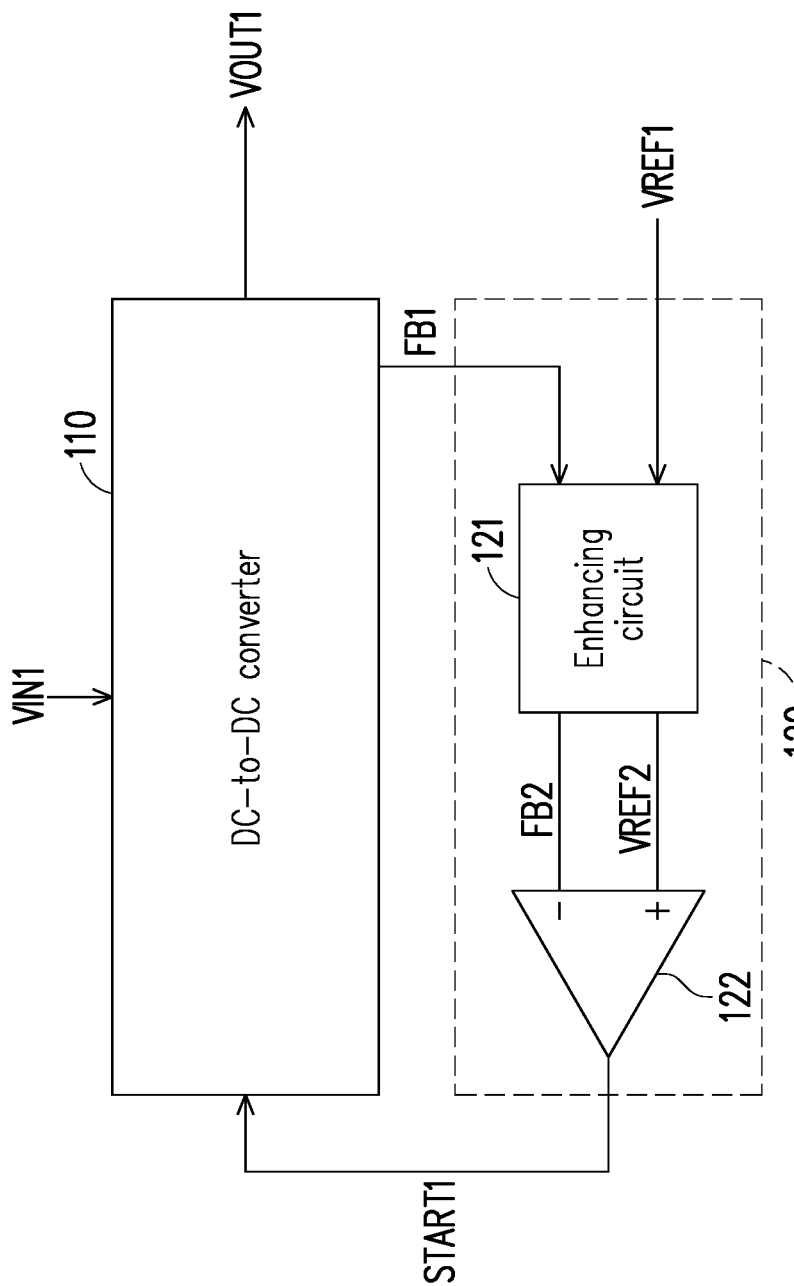
FIG. 1 is a circuit block schematic view of a power supply apparatus according to an embodiment of the disclosure.

The term "coupled (or connected)" as used throughout this specification (including the scope of the application) may refer to any direct or indirect means of connection. For example, if it is described in the specification that a first device is coupled (or connected) to a second device, it should be construed that the first device can be directly connected to the second device, or the first device can be indirectly connected to the second device through another device or some type of connecting means. Terms "first," "second" and the like mentioned in the full text (including the scope of the patent application) of the description of this application are used only to name the elements or to distinguish different embodiments or scopes and are not intended to limit the upper or lower limit of the number of the elements, nor is it intended to limit the order of the elements. In addition, wherever possible, elements/components/steps with the same reference numerals in the drawings and embodiments represent the same or similar parts. Elements/components/steps that use the same reference numerals or use the same terminology in different embodiments may refer to relevant descriptions of each other.

FIG. 1 is a circuit block schematic view of a power supply apparatus 100 according to an embodiment of the disclosure. The power supply apparatus 100 shown in FIG. 1 includes a DC-to-DC converter 110 and a feedback control device 120. The DC-to-DC converter 110 may be a COT (constant ON time) type DC-to-DC converter. The feedback control device 120 may generate a control signal START1 to the DC-to-DC converter 110 based on an output voltage VOUT1 of the DC-to-DC converter 110. For example, the DC-to-DC converter 110 may divide the output voltage VOUT1 to generate a feedback voltage FB1 (original feedback voltage) corresponding to the output voltage VOUT1. The feedback control device 120 may generate the control signal START1 to the DC-to-DC converter 110 based on the feedback voltage FB1 and a reference voltage VREF1 (original reference voltage). Based on the control signal START1, the DC-to-DC converter 110 may convert an input voltage VIN1 into the output voltage VOUT1. Based on actual design and application, the DC-to-DC converter 110 may include a COT buck converter, a COT boost converter, a buck-boost converter, or other DC-to-DC converters.

In the embodiment shown in FIG. 1, the feedback control device 120 includes an enhancing circuit 121 and a comparator 122. The enhancing circuit 121 is coupled to the DC-to-DC converter 110 to receive the feedback voltage FB1 corresponding to the output voltage VOUT1. The enhancing circuit 121 is also coupled to a voltage source (not shown in FIG. 1) to receive the reference voltage VREF1.

The enhancing circuit 121 is coupled to the comparator 122 to provide a feedback voltage FB2 and a reference voltage VREF2. In an embodiment, the enhancing circuit 121 may adjust the feedback voltage FB1 to generate an enhanced feedback voltage as the feedback voltage FB2 and use the reference voltage VREF1 as the reference voltage VREF2. In another embodiment, the enhancing circuit 121 may adjust the reference voltage VREF1 to generate an enhanced reference voltage as the reference voltage VREF2 and use the feedback voltage FB1 as the feedback voltage FB2. In yet another embodiment, the enhancing circuit 121 may adjust the reference voltage VREF1 to generate the enhanced reference voltage as the reference voltage VREF2 and adjust the feedback voltage FB1 to generate the enhanced feedback voltage as the feedback voltage FB2.

The comparator 122 is coupled to the enhancing circuit 121 to receive the reference voltage VREF2 and the feedback voltage FB2. The comparator 122 may generate a comparison result based on the reference voltage VREF2 and the feedback voltage FB2 as the control signal START1 to a feedback control terminal of the DC-to-DC converter 110. Based on the control signal START1, the DC-to-DC converter 110 may convert the input voltage VIN1 into the output voltage VOUT1.

Figure 2:
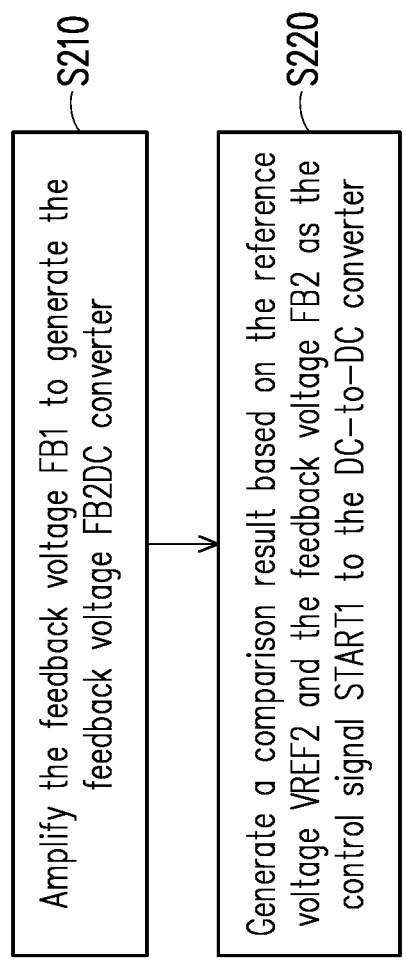
FIG. 2 is a flowchart of a feedback control method according to an embodiment of the disclosure.

FIG. 2 is a flowchart of a feedback control method according to an embodiment of the disclosure. Referring to FIG. 1 and FIG. 2, in step S210, the enhancing circuit 121 may generate the feedback voltage FB2 to a first input terminal (e.g., a non-inverting input terminal) of the comparator 122 based on the feedback voltage FB1 corresponding to the output voltage VOUT1. In detail, in step S210, the enhancing circuit 121 may amplify the feedback voltage FB1 to generate the feedback voltage FB2. Based on the actual design, the enhancing circuit 121 may provide the reference voltage VREF1 as the reference voltage VREF2 to a second input terminal of the comparator 122 (e.g., the inverting input terminal), or adjust the reference voltage VREF1 referring to the description of one of FIG. 5, FIG. 6, and FIG. 7 to generate the reference voltage VREF2 to the comparator 122. In step S220, the comparator 122 may generate a comparison result based on the reference voltage VREF2 and the feedback voltage FB2 as the control signal START1 to the feedback control terminal of the DC-to-DC converter 110.

Figure 3:
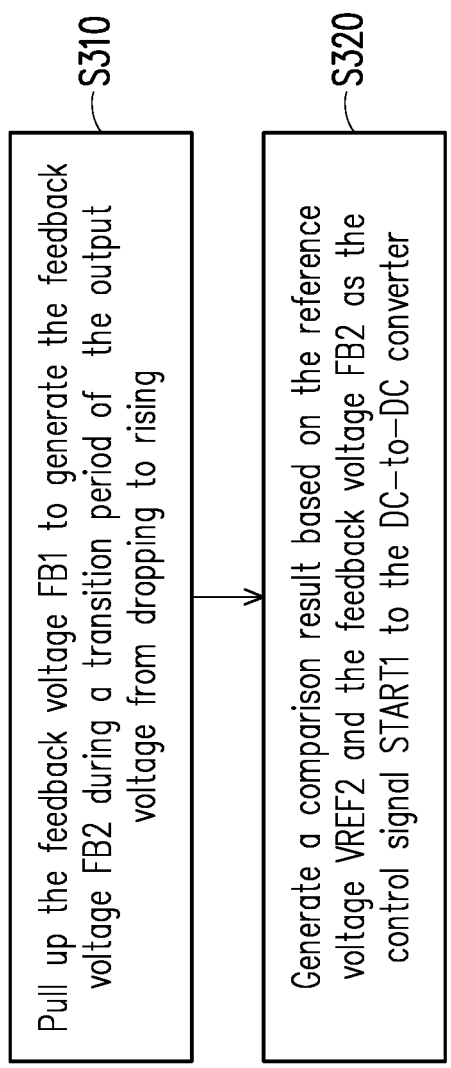
FIG. 3 is a flowchart of a feedback control method according to another embodiment of the disclosure.

FIG. 3 is a flowchart of a feedback control method according to another embodiment of the disclosure. Referring to FIG. 1 and FIG. 3, in step S310, the enhancing circuit 121 may generate the feedback voltage FB2 to a first input terminal of the comparator 122 based on the feedback voltage FB1. In detail, during a transition period of the output voltage VOUT1 from dropping to rising, the enhancing circuit 121 may pull up the feedback voltage FB1 to generate the feedback voltage FB2 (step S310). Based on the actual design, the enhancing circuit 121 may provide the reference voltage VREF1 as the reference voltage VREF2 to the second input terminal of the comparator 122, or adjust the reference voltage VREF1 referring to the description of one of FIG. 5, FIG. 6, and FIG. 7 to generate the reference voltage VREF2 to the second input terminal of the comparator 122. In step S320, the comparator 122 may generate a comparison result based on the reference voltage VREF2 and the feedback voltage FB2 as the control signal START1 to the feedback control terminal of the DC-to-DC converter 110.

Figure 4:
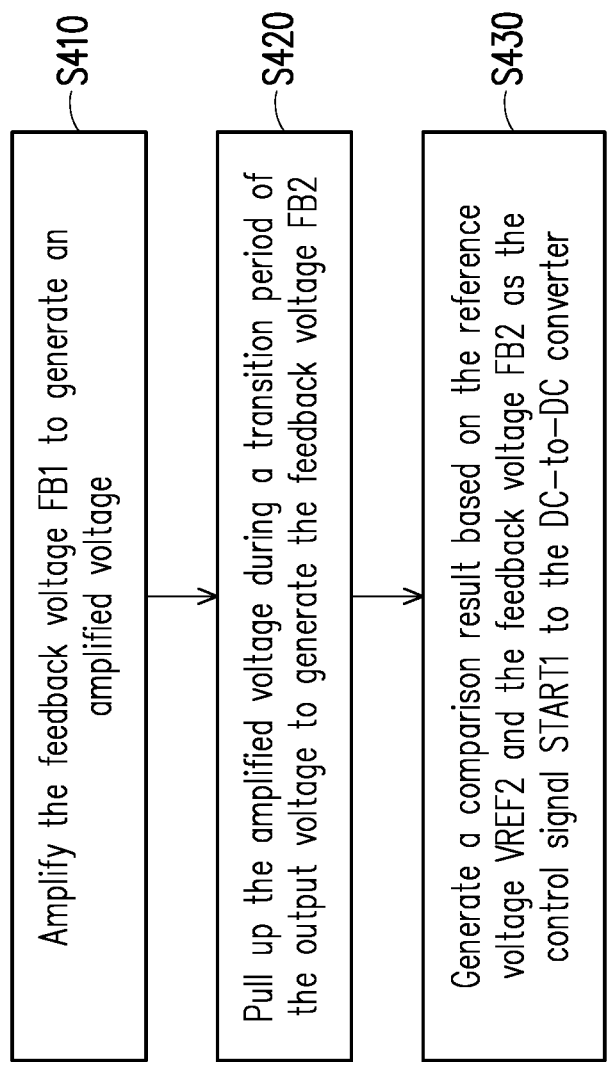
FIG. 4 is a flowchart of a feedback control method according to another embodiment of the disclosure.

FIG. 4 is a flowchart of a feedback control method according to another embodiment of the disclosure. Referring to FIG. 1 and FIG. 4, the enhancing circuit 121 may generate the feedback voltage FB2 to the first input terminal of the comparator 122 based on the feedback voltage FB1. In detail, in step S410, the enhancing circuit 121 may amplify the feedback voltage FB1 to generate an amplified voltage. The enhancing circuit 121 may pull up the amplified voltage during the transition period of the output voltage VOUT1 from dropping to rising to generate the feedback voltage FB2 (step S420). Based on the actual design, the enhancing circuit 121 may provide the reference voltage VREF1 as the reference voltage VREF2 to the second input terminal of the comparator 122, or adjust the reference voltage VREF1 referring to the description of one of FIG. 5, FIG. 6, and FIG. 7 to generate the reference voltage VREF2 to the second input terminal of the comparator 122. In step S430, the comparator 122 may generate a comparison result based on the reference voltage VREF2 and the feedback voltage FB2 as the control signal START1 to the feedback control terminal of the DC-to-DC converter 110.

Figure 5:
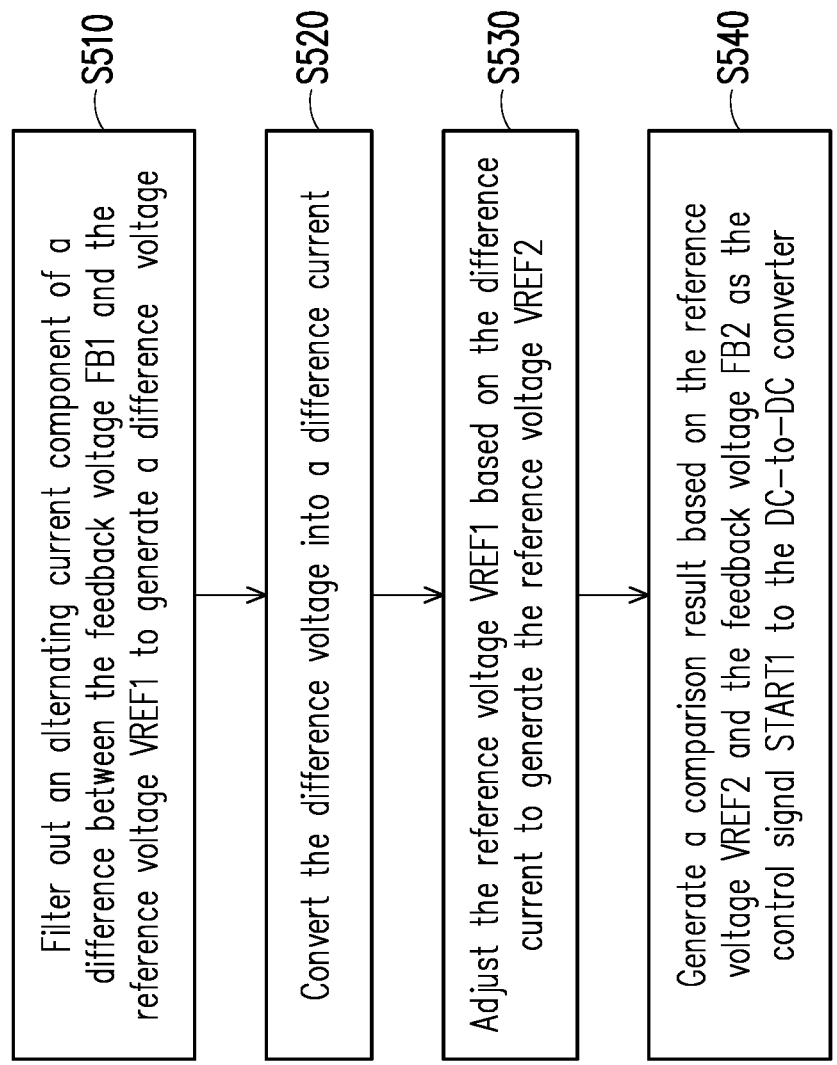
FIG. 5 is a flowchart of a feedback control method according to yet another embodiment of the disclosure.

FIG. 5 is a flowchart of a feedback control method according to yet another embodiment of the disclosure. Referring to FIG. 1 and FIG. 5, the enhancing circuit 121 may generate the reference voltage VREF2 to the second input terminal of the comparator 122 based on the feedback voltage FB1 and the reference voltage VREF1. In detail, in step S510, the enhancing circuit 121 may filter out an alternating current component of a difference between the feedback voltage FB1 and the reference voltage VREF1 to generate a difference voltage. In step S520, the enhancing circuit 121 may convert the difference voltage into a difference current. In step S530, the enhancing circuit 121 may adjust the reference voltage VREF1 based on the difference current to generate the reference voltage VREF2. Based on the actual design, the enhancing circuit 121 may provide the feedback voltage FB1 as the feedback voltage FB2 to the first input terminal of the comparator 122, or adjust the feedback voltage FB1 referring to the description of one of FIG. 2, FIG. 3, and FIG. 4 to generate the feedback voltage FB2 to the first input terminal of the comparator 122. In step S540, the comparator 122 may generate a comparison result based on the reference voltage VREF2 and the feedback voltage FB2 as the control signal START1 to the feedback control terminal of the DC-to-DC converter 110.

Figure 6:
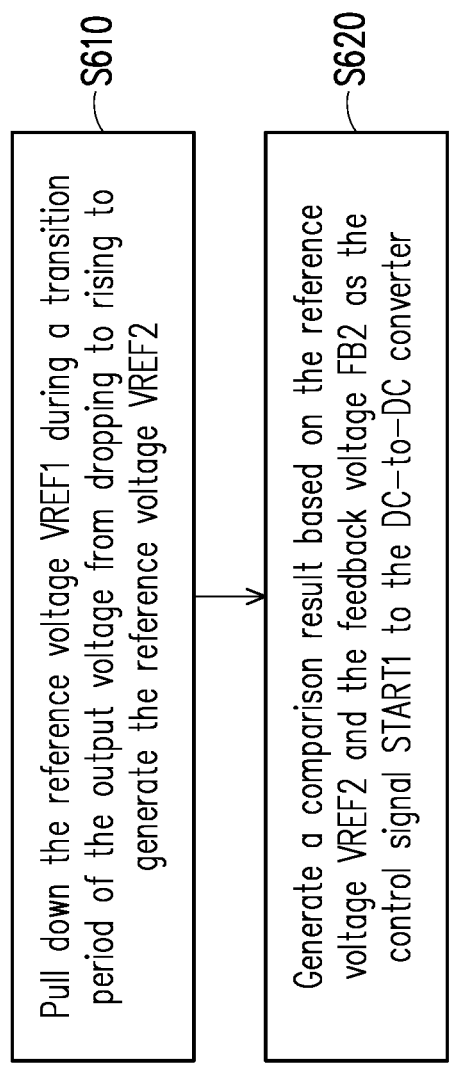
FIG. 6 is a flowchart of a feedback control method according to another embodiment of the disclosure.

FIG. 6 is a flowchart of a feedback control method according to another embodiment of the disclosure. Referring to FIG. 1 and FIG. 6, the enhancing circuit 121 may generate the reference voltage VREF2 to the second input terminal of the comparator 122 based on the feedback voltage FB1 and the reference voltage VREF1. In detail, the enhancing circuit 121 may pull down the reference voltage VREF1 during the transition period of the output voltage VOUT1 from dropping to rising to generate the reference voltage VREF2 (step S610). Based on the actual design, the enhancing circuit 121 may provide the feedback voltage FB1 as the feedback voltage FB2 to the first input terminal of the comparator 122, or adjust the feedback voltage FB1 referring to the description of one of FIG. 2, FIG. 3, and FIG. 4 to generate the feedback voltage FB2 to the first input terminal of the comparator 122. In step S620, the comparator 122 may generate a comparison result based on the reference voltage VREF2 and the feedback voltage FB2 as the control signal START1 to the feedback control terminal of the DC-to-DC converter 110.

Figure 7:
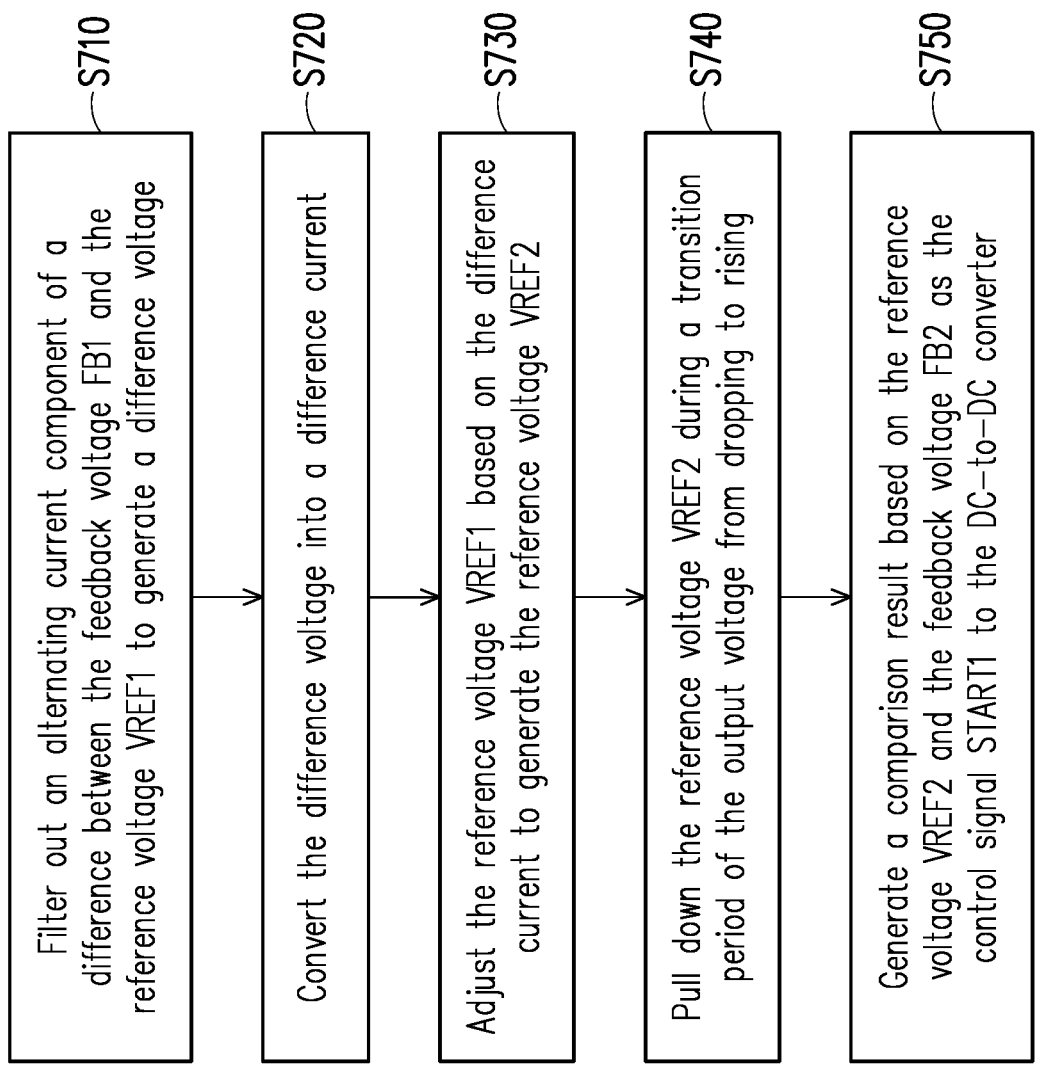
FIG. 7 is a flowchart of a feedback control method according to another embodiment of the disclosure.

FIG. 7 is a flowchart of a feedback control method according to another embodiment of the disclosure. Referring to FIG. 1 and FIG. 7, the enhancing circuit 121 may generate the reference voltage VREF2 to the second input terminal of the comparator 122 based on the feedback voltage FB1 and the reference voltage VREF1. In detail, in step S710, the enhancing circuit 121 may filter out an alternating current component of a difference between the feedback voltage FB1 and the reference voltage VREF1 to generate a difference voltage. In step S720, the enhancing circuit 121 may convert the difference voltage into a difference current. In step S730, the enhancing circuit 121 may adjust the reference voltage VREF1 based on the difference current to generate the reference voltage VREF2. The enhancing circuit 121 may pull down the reference voltage VREF2 during the transition period of the output voltage VOUT1 from dropping to rising (step S740). Based on the actual design, the enhancing circuit 121 may provide the feedback voltage FB1 as the feedback voltage FB2 to the first input terminal of the comparator 122, or adjust the feedback voltage FB1 referring to the description of one of FIG. 2, FIG. 3, and FIG. 4 to generate the feedback voltage FB2 to the first input terminal of the comparator 122. In step S750, the comparator 122 may generate a comparison result based on the reference voltage VREF2 and the feedback voltage FB2 as the control signal START1 to the feedback control terminal of the DC-to-DC converter 110.

Based on the above, the enhancing circuit 121 may: generate an enhanced reference voltage (e.g., the reference voltage VREF1) to the comparator 122 (while providing an original feedback voltage of the DC-to-DC converter to the comparator) based on an original reference voltage (e.g., the reference voltage VREF2); or generate an enhanced feedback voltage (e.g., the feedback voltage FB2) to the comparator 122 (while providing the original reference voltage to the comparator) based on the original feedback voltage (e.g., the feedback voltage FB1); or generate the enhanced feedback voltage and the enhanced reference voltage to the comparator 122 based on the original feedback voltage and the original reference voltage. The feedback control device 120 may first adjust the front-end signal (the original reference voltage and/or the original feedback voltage) to reduce the characteristics requirements for the comparator 122 (high gain and high bandwidth).

Figure 8:
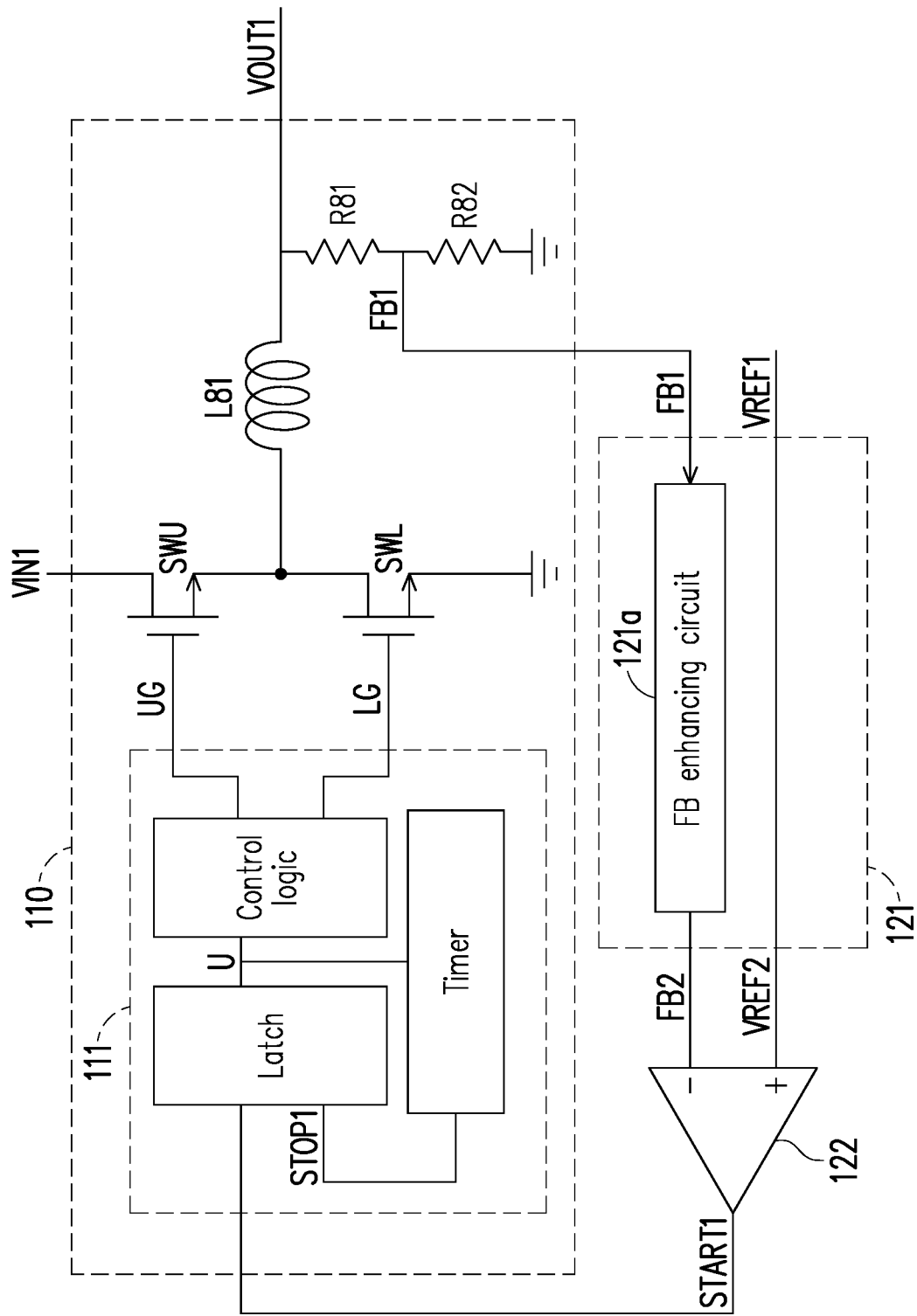
FIG. 8 is a circuit block schematic view of a DC-to-DC converter and an enhancing circuit according to an embodiment of the disclosure.

FIG. 8 is a circuit block schematic view of a DC-to-DC converter 110 and an enhancing circuit 121 according to an embodiment of the disclosure. The DC-to-DC converter 110 and the enhancing circuit 121 shown in FIG. 8 may be used as one of the embodiments of the DC-to-DC converter 110 and the enhancing circuit 121 shown in FIG. 1. In the embodiment shown in FIG. 8, the DC-to-DC converter 110 includes a COT control circuit 111, an upper power switch SWU, a lower power switch SWL, an inductor L81, a resistor R81, and a resistor R82. Based on the control signal START1, the COT control circuit 111 may generate switch signals UG and LG to control the upper power switch SWU and the lower power switch SWL.

For example, in response to the feedback voltage FB2 being greater than the reference voltage VREF2, the control signal START1 is a low logic level. Otherwise, the control signal START1 is a high logic level. A latch of the COT control circuit 111 may latch the control signal START1 and output a control signal U to a control logic and a timer. In response to the level of the control signal U being pulled up, the timer starts timing. In response to the timing result of the timer of the COT control circuit 111 reaching a preset time, the timer transmits a stop pulse STOP1 to the latch of the COT control circuit 111, causing the level of the control signal U to be pulled down. The preset time of the timer is determined according to the actual design. In response to the level of the control signal U being pulled up, the control logic of the COT control circuit 111 may pull up the level of the switch signal UG and pull down the level of the switch signal LG. Conversely, in response to the level of the control signal U being pulled down, the control logic of the COT control circuit 111 may pull down the level of the switch signal UG and pull up the level of the switch signal LG. Thus, the COT control circuit 111 may pull up the level of the switch signal UG starting from a time point of the transition of the control signal START1 (from low to high) and maintain the preset time (the constant ON time), and then pull down the level of the switch signal UG at the end of the preset time.

A first terminal of the upper power switch SWU receives the input voltage VIN1. A first terminal of the lower power switch SWL is coupled to a second terminal of the upper power switch SWU. A second terminal of the lower power switch SWL is coupled to the reference voltage (e.g., the grounding voltage or other fixed voltage). A first terminal of the inductor L81 is coupled to the second terminal of the upper power switch SWU and the first terminal of the lower power switch SWL. A second terminal of the inductor L81 provides the output voltage VOUT1. A first terminal of the resistor R81 is coupled to the second terminal of the inductor L81. A second terminal of the resistor R81 provides the feedback voltage FB1 to the enhancing circuit 121. A first terminal of the resistor R82 is coupled to the second terminal of the resistor R81. A second terminal of the resistor R82 is coupled to the reference voltage (e.g., the grounding voltage or other fixed voltage).

In the embodiment shown in FIG. 8, the enhancing circuit 121 includes an FB enhancing circuit 121a. The FB enhancing circuit 121a may adjust the feedback voltage FB1 (original feedback voltage) to generate the feedback voltage FB2 (enhanced feedback voltage) to the comparator 122. For the method of generating the feedback voltage FB2 by the FB enhancing circuit 121a, reference may be made to the description of one of FIG. 2, FIG. 3 and FIG. 4. In addition, the enhancing circuit 121 shown in FIG. 8 further provides the reference voltage VREF1 (original reference voltage) to the comparator 122 as the reference voltage VREF2.

Figure 9:
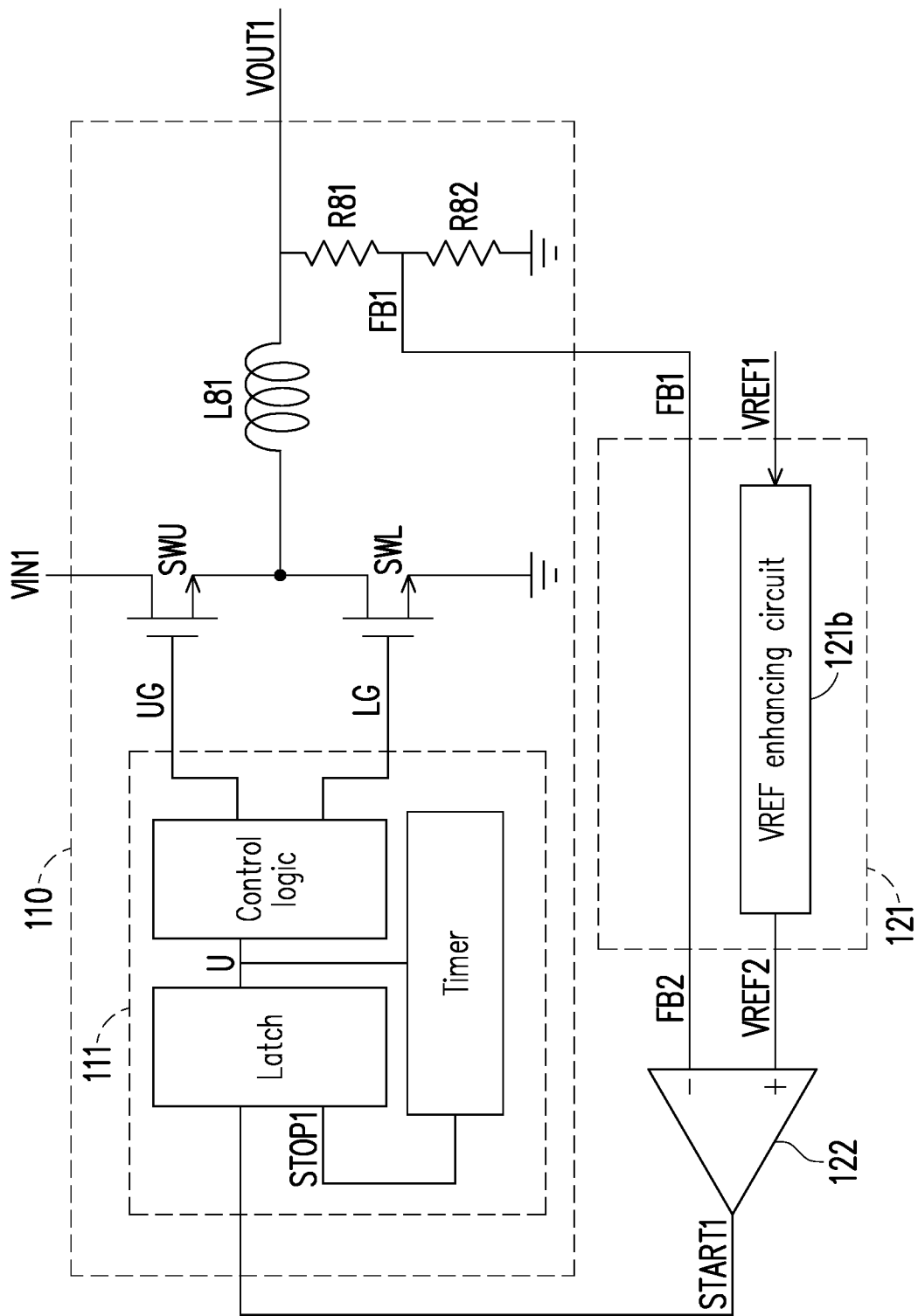
FIG. 9 is a circuit block schematic view of an enhancing circuit according to another embodiment of the disclosure.

FIG. 9 is a circuit block schematic view of an enhancing circuit 121 according to another embodiment of the disclosure. The enhancing circuit 121 shown in FIG. 9 may be used as one of the embodiments of the enhancing circuit 121 shown in FIG. 1. For the DC-to-DC converter 110 shown in FIG. 9, reference may be made to the relevant description of the DC-to-DC converter 110 shown in FIG. 8, so details are not repeated herein. In the embodiment shown in FIG. 9, the enhancing circuit 121 includes a VREF enhancing circuit 121b. The VREF enhancing circuit 121b may adjust the reference voltage VREF1 (original reference voltage) to generate the reference voltage VREF2 (enhanced reference voltage) to the comparator 122. For the method of generating the reference voltage VREF2 by the VREF enhancing circuit 121b, reference may be made to the description of one of FIG. 5, FIG. 6 and FIG. 7. In addition, the enhancing circuit 121 shown in FIG. 9 further provides the feedback voltage FB1 (original feedback voltage) to the comparator 122 as the feedback voltage FB2.

Figure 10:
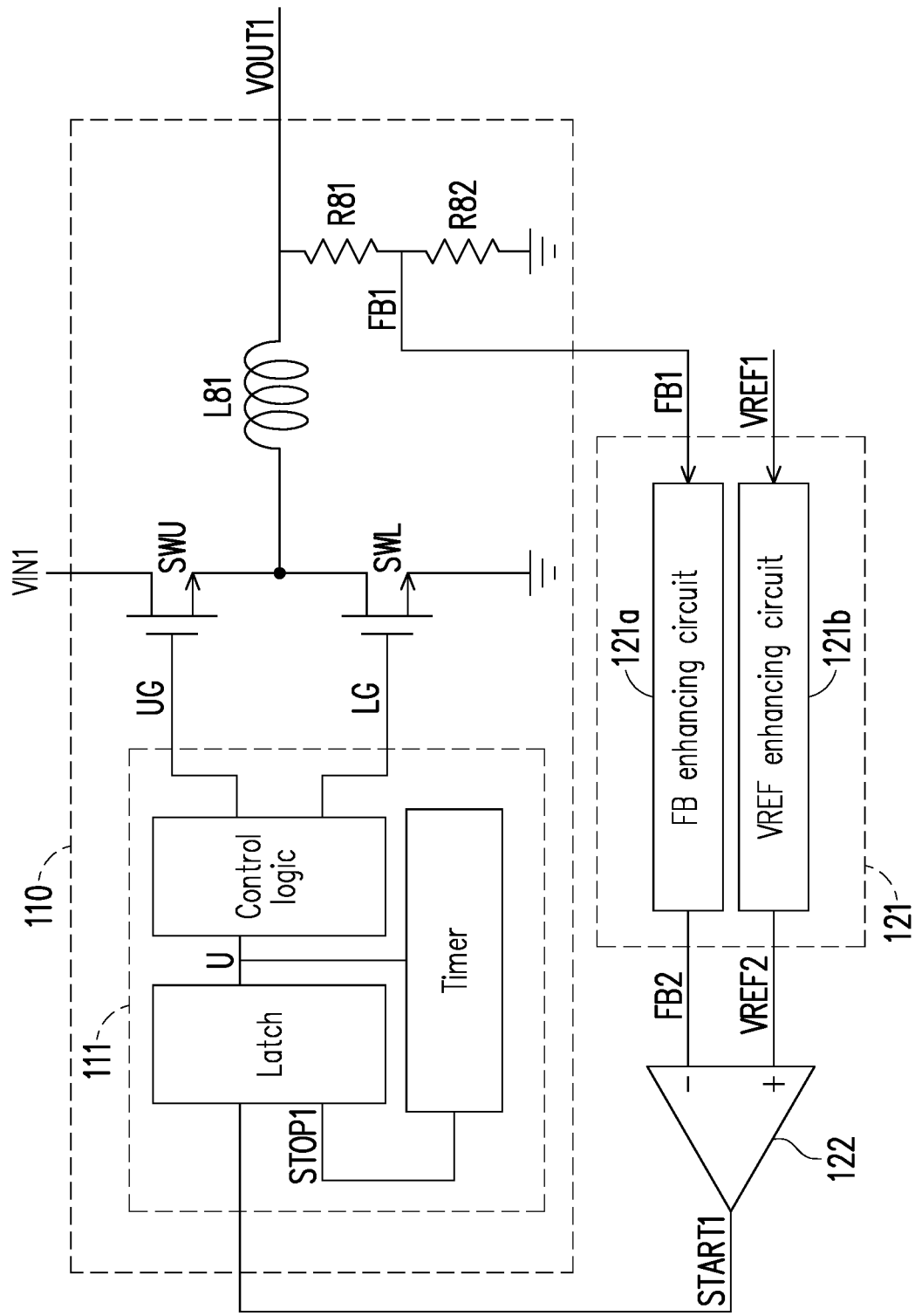
FIG. 10 is a circuit block schematic view of an enhancing circuit according to another embodiment of the disclosure.

FIG. 10 is a circuit block schematic view of an enhancing circuit 121 according to another embodiment of the disclosure. The enhancing circuit 121 shown in FIG. 10 may be used as one of the embodiments of the enhancing circuit 121 shown in FIG. 1. For the DC-to-DC converter 110 shown in FIG. 10, reference may be made to the relevant description of the DC-to-DC converter 110 shown in FIG. 8, so details are not repeated herein. In the embodiment shown in FIG. 10, the enhancing circuit 121 includes the FB enhancing circuit 121a and the VREF enhancing circuit 121b. The FB enhancing circuit 121a may adjust the feedback voltage FB1 (original feedback voltage) to generate the feedback voltage FB2 (enhanced feedback voltage) to the comparator 122. For the method of generating the feedback voltage FB2 by the FB enhancing circuit 121a, reference may be made to the description of one of FIG. 2, FIG. 3 and FIG. 4. The VREF enhancing circuit 121b may adjust the reference voltage VREF1 (original reference voltage) to generate the reference voltage VREF2 (enhanced reference voltage) to the comparator 122. For the method of generating the reference voltage VREF2 by the VREF enhancing circuit 121b, reference may be made to the description of one of FIG. 5, FIG. 6 and FIG. 7.

Figure 11:
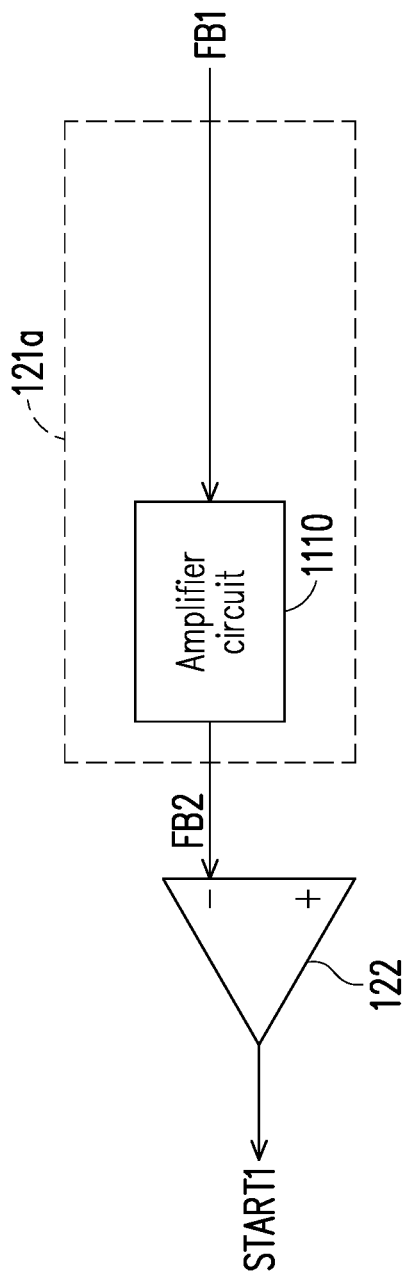
FIG. 11 is a circuit block schematic view of a FB enhancing circuit according to an embodiment of the disclosure.

FIG. 11 is a circuit block schematic view of a FB enhancing circuit 121a according to an embodiment of the disclosure. The FB enhancing circuit 121a shown in FIG. 11 may be used as one of the embodiments of the FB enhancing circuit 121a shown in FIG. 8 or FIG. 10. In the embodiment shown in FIG. 11, the FB enhancing circuit 121a includes an amplifier circuit 1110. An input terminal of the amplifier circuit 1110 is coupled to the DC-to-DC converter 110 to receive the feedback voltage FB1 corresponding to the output voltage VOUT1. The amplifier circuit 1110 may amplify the feedback voltage FB1 to generate the feedback voltage FB2. An output terminal of the amplifier circuit 1110 is coupled to the comparator 122 to provide the feedback voltage FB2.

Figure 12:
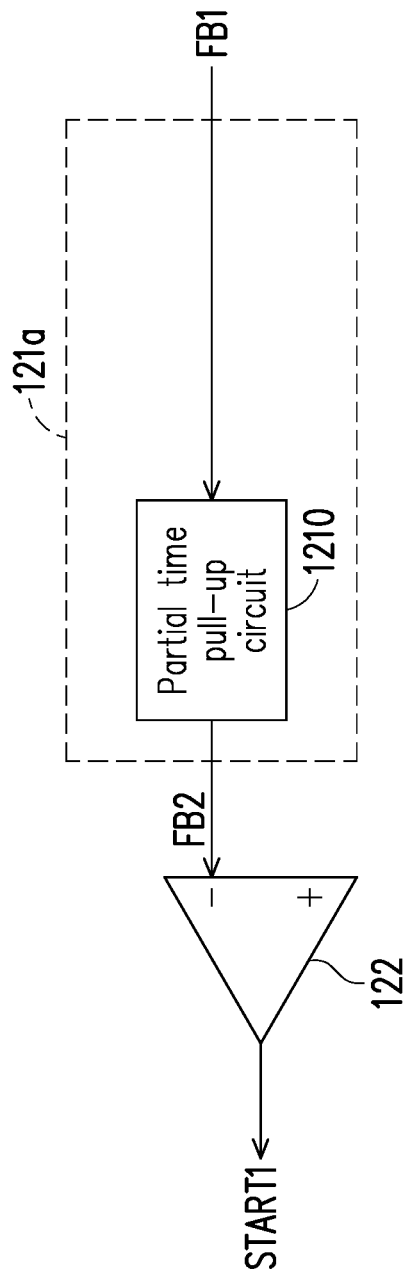
FIG. 12 is a circuit block schematic view of a FB enhancing circuit according to another embodiment of the disclosure.

FIG. 12 is a circuit block schematic view of a FB enhancing circuit 121a according to another embodiment of the disclosure. The FB enhancing circuit 121a shown in FIG. 12 may be used as one of the embodiments of the FB enhancing circuit 121a shown in FIG. 8 or FIG. 10. In the embodiment shown in FIG. 12, the FB enhancing circuit 121a includes a partial time pull-up circuit 1210. A pull-up terminal of the partial time pull-up circuit 1210 is coupled to the DC-to-DC converter 110 to receive the feedback voltage FB1 corresponding to the output voltage VOUT1. The partial time pull-up circuit 1210 pulls up the feedback voltage FB1 during the transition period of the output voltage VOUT1 from dropping to rising and does not pull up the feedback voltage FB1 at other time to generate the feedback voltage FB2 to the comparator 122.

Figure 13:
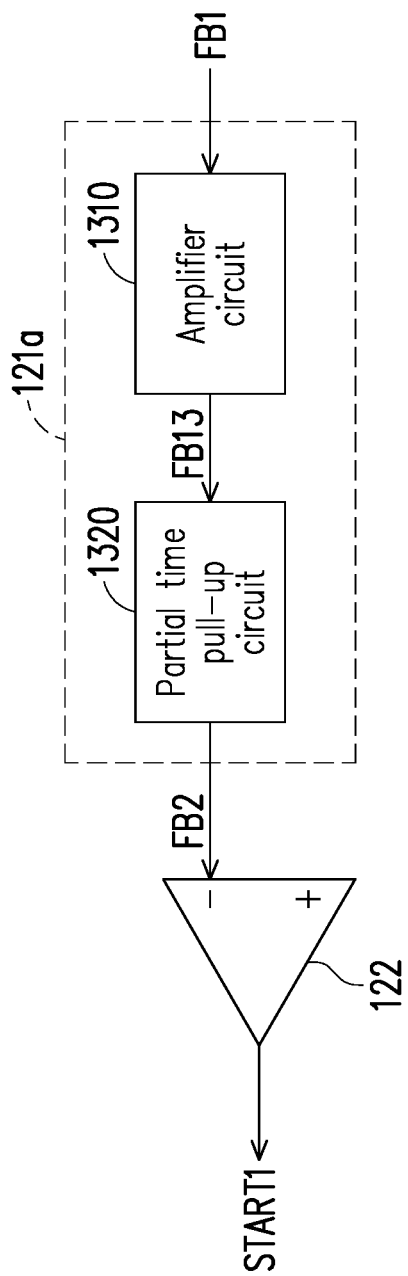
FIG. 13 is a circuit block schematic view of a FB enhancing circuit according to another embodiment of the disclosure.

FIG. 13 is a circuit block schematic view of a FB enhancing circuit 121a according to another embodiment of the disclosure. The FB enhancing circuit 121a shown in FIG. 13 may be used as one of the embodiments of the FB enhancing circuit 121a shown in FIG. 8 or FIG. 10. In the embodiment shown in FIG. 13, the FB enhancing circuit 121a includes an amplifier circuit 1310 and a partial time pull-up circuit 1320. An input terminal of the amplifier circuit 1310 is coupled to the DC-to-DC converter 110 to receive the feedback voltage FB1 corresponding to the output voltage VOUT1. The amplifier circuit 1310 may amplify the first feedback voltage FB1 to generate an amplified voltage FB13. A pull-up terminal of the partial time pull-up circuit 1320 is coupled to an output terminal of the amplifier circuit 1310 to receive the amplified voltage FB13. The partial time pull-up circuit 1320 pulls up the amplified voltage FB13 during the transition period of the output voltage VOUT1 from dropping to rising and does not pull up the amplified voltage FB13 at other time to generate the feedback voltage FB2 to the comparator 122.

Figure 14:
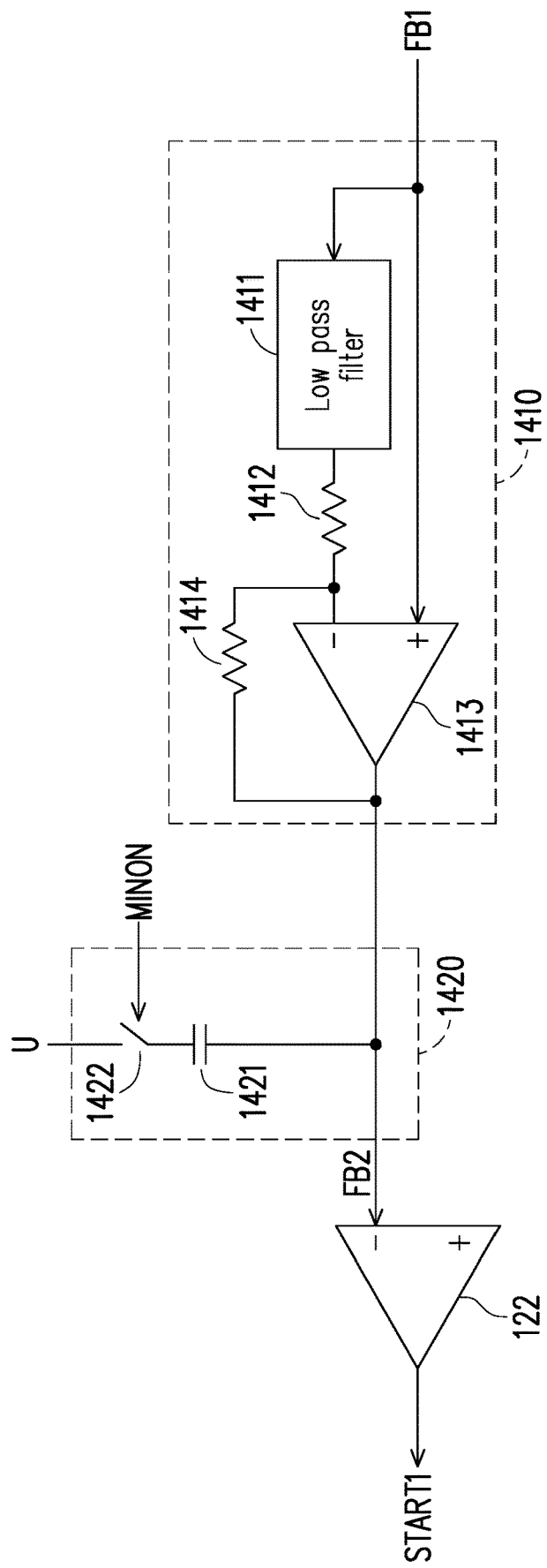
FIG. 14 is a circuit block schematic view of an amplifier circuit and a partial time pull-up circuit according to an embodiment of the disclosure.

FIG. 14 is a circuit block schematic view of an amplifier circuit 1410 and a partial time pull-up circuit 1420 according to an embodiment of the disclosure. The amplifier circuit 1410 shown in FIG. 14 may be used as one of the embodiments of the amplifier circuit 1110 shown in FIG. 11 or the amplifier circuit 1310 shown in FIG. 13. In the embodiment shown in FIG. 14, the amplifier circuit 1410 includes a low pass filter 1411, a resistor 1412, an operational amplifier 1413, and a resistor 1414. An input terminal of the low pass filter 1411 is coupled to an input terminal of the amplifier circuit 1410. The first terminal of the resistor 1412 is coupled to an output terminal of low pass filter 1411. A first input terminal (e.g., the inverting input terminal) of the operational amplifier 1413 is coupled to a second terminal of the resistor 1412. A second input terminal (e.g., the non-inverting input terminal) of the operational amplifier 1413 is coupled to the input terminal of the amplifier circuit 1410. An output terminal of the operational amplifier 1413 is coupled to an output terminal of the amplifier circuit 1410. A first terminal and a second terminal of the resistor 1414 are respectively coupled to the first input terminal and the output terminal of the operational amplifier 1413. The resistivity of the resistor 1414 may be N times the resistivity of the resistor 1412, and N may be any real number determined according to the actual design. Based on the determination of the value of N, an amplifying ratio of the amplifier circuit 1410 may be adjusted accordingly.

The partial time pull-up circuit 1420 shown in FIG. 14 may be used as one of the embodiments of the partial time pull-up circuit 1210 shown in FIG. 12 or the partial time pull-up circuit 1320 shown in FIG. 13. In the embodiment shown in FIG. 14, the partial time pull-up circuit 1420 includes a capacitor 1421 and a switch 1422. A first terminal of the capacitor 1421 is coupled to a pull-up terminal of the partial time pull-up circuit 1420. A first terminal of the switch 1422 is coupled to a second terminal of the capacitor 1421. A second terminal of the switch 1422 is coupled to the DC-to-DC converter 110 to receive a pull-up voltage (e.g., the control signal U shown in FIG. 8). A control terminal of the switch 1422 is coupled to the DC-to-DC converter 110 to receive a switch signal MINON. A pulse width of the switch signal MINON is a lower limit of a conduction time of the upper power switch SWU. In response to the timing result of the timer of the COT control circuit 111 reaching a preset time, the timer transmits a stop pulse STOP1 to the latch of the COT control circuit 111. The preset time is greater than a minimum turned-on period (the lower limit of the conduction time of the upper power switch SWU). Thus, the timer of the COT control circuit 111 may generate the switch signal MINON to the switch 1422. Based on the switch signal MINON, the switch 1422 is turned on during the minimum turned-on period including "a turning time point of the output voltage VOUT1 from dropping to rising". The switch 1422 is turned off during other periods except for the minimum turned-on period.

Based on the above, the amplifier circuit 1410 may amplify the signal of the feedback voltage FB1 to generate the feedback voltage FB2 to the comparator 122. After the control signal START1 output by the comparator 122 transits to a high logic level, the partial time pull-up circuit 1420 uses the coupling characteristics of the capacitor to quickly pull up the feedback voltage FB2 to allow the control signal START1 output by the comparator 122 to quickly recover to a low logic level. Thus, the enhancing circuit 121 may strengthen the feedback voltage FB2 of the COT comparator 122, such as amplifying and/or shaping the feedback voltage FB2, so that the feedback control device 120 may respond quickly.

Figure 15:
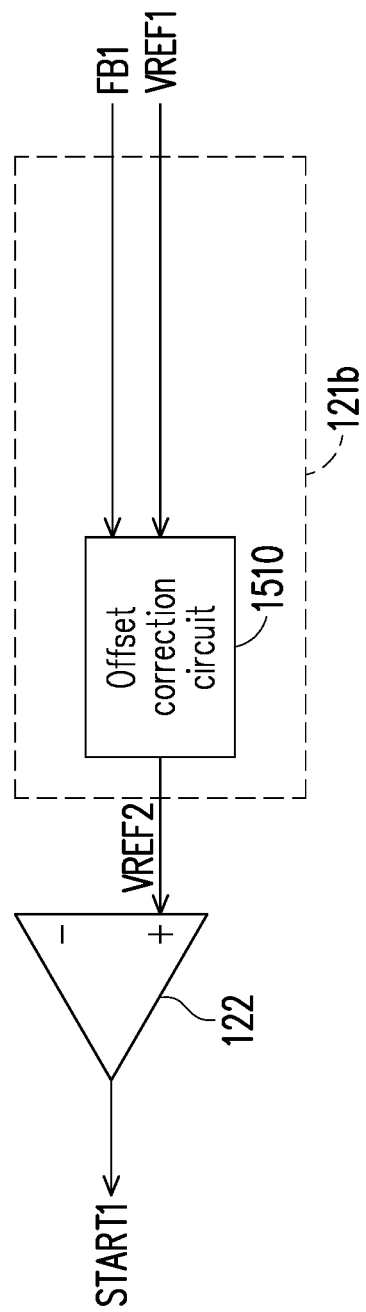
FIG. 15 is a circuit block schematic view of a VREF enhancing circuit according to an embodiment of the disclosure.

FIG. 15 is a circuit block schematic view of a VREF enhancing circuit 121b according to an embodiment of the disclosure. The VREF enhancing circuit 121b shown in FIG.

15 may be used as one of the embodiments of the VREF enhancing circuit 121b shown in FIG. 9 or 10. In the embodiment shown in FIG. 15, the VREF enhancing circuit 121b includes an offset correction circuit 1510. A first input terminal of the offset correction circuit 1510 is coupled to the DC-to-DC converter 110 to receive the feedback voltage FB1 corresponding to the output voltage VOUT1. A second input terminal of the offset correction circuit 1510 receives the reference voltage VREF1. The offset correction circuit 1510 may filter out an alternating current component of a difference between the feedback voltage FB1 and the reference voltage VREF1 to generate a difference voltage, and then the offset correction circuit 1510 may convert the difference voltage into a difference current. The offset correction circuit 1510 may adjust the reference voltage VREF1 based on the difference current to generate the reference voltage VREF2. An output terminal of the offset correction circuit 1510 is coupled to the comparator 122 to provide the reference voltage VREF2.

Figure 16:
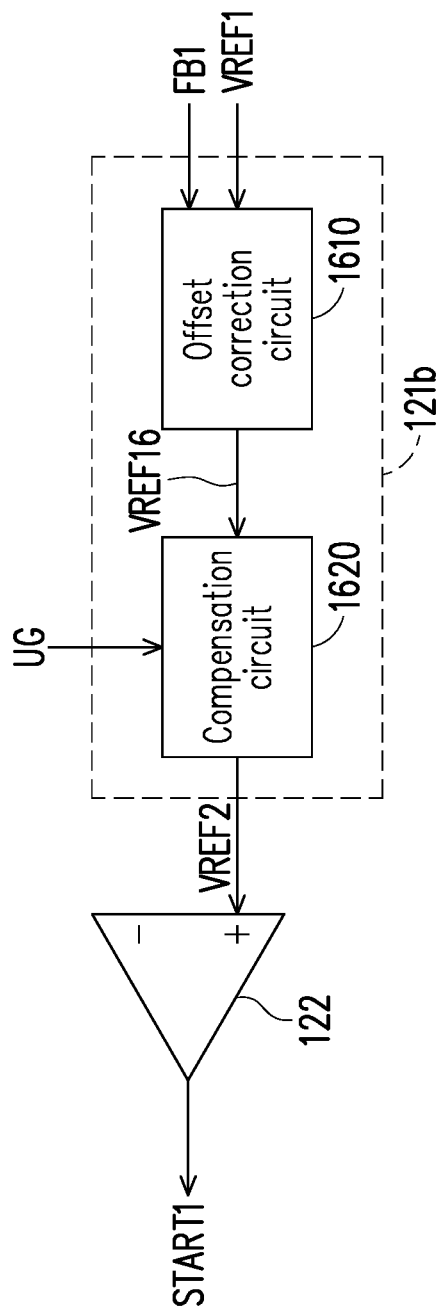
FIG. 16 is a circuit block schematic view of a VREF enhancing circuit according to another embodiment of the disclosure.

FIG. 16 is a circuit block schematic view of a VREF enhancing circuit 121b according to another embodiment of the disclosure. The VREF enhancing circuit 121b shown in FIG. 16 may be used as one of the embodiments of the VREF enhancing circuit 121b shown in FIG. 9 or 10. In the embodiment shown in FIG. 16, the VREF enhancing circuit 121b includes an offset correction circuit 1610 and a compensation circuit 1620. A first input terminal of the offset correction circuit 1610 is coupled to the DC-to-DC converter 110 to receive the feedback voltage FB1 corresponding to the output voltage VOUT1. A second input terminal of the offset correction circuit 1610 receives the reference voltage VREF1. The offset correction circuit 1610 may filter out an alternating current component of a difference between the feedback voltage FB1 and the reference voltage VREF1 to generate a difference voltage, and then the offset correction circuit 1610 may convert the difference voltage into a difference current. The offset correction circuit 1610 may adjust the reference voltage VREF1 based on the difference current to generate a corrected reference voltage VREF16. An input terminal of the compensation circuit 1620 is coupled to an output terminal of the offset correction circuit 1610 to receive the corrected reference voltage VREF16. The compensation circuit 1810 is further coupled to the DC-to-DC converter 110 to receive the switch signal UG. The compensation circuit 1620 compensates the corrected reference voltage VREF16 based on the switch signal UG of the DC-to-DC converter 110 to generate the reference voltage VREF2. An output terminal of the compensation circuit 1620 is coupled to the comparator 122 to provide the reference voltage VREF2.

Figure 17:
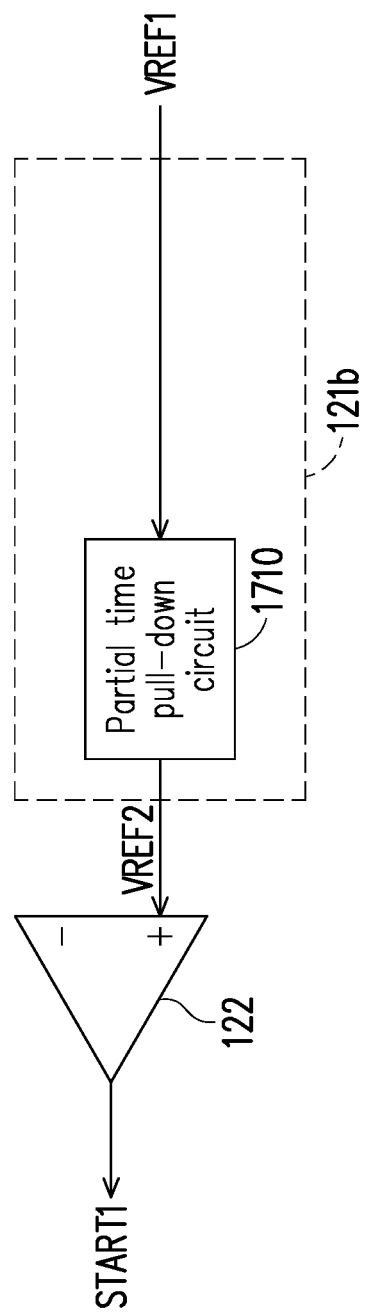
FIG. 17 is a circuit block schematic view of a VREF enhancing circuit according to another embodiment of the disclosure.

FIG. 17 is a circuit block schematic view of a VREF enhancing circuit 121b according to another embodiment of the disclosure. The VREF enhancing circuit 121b shown in FIG. 17 may be used as one of the embodiments of the VREF enhancing circuit 121b shown in FIG. 9 or 10. In the embodiment shown in FIG. 17, the VREF enhancing circuit 121b includes a partial time pull-down circuit 1710. A pull-down terminal of the partial time pull-down circuit 1710 receives the reference voltage VREF1. The partial time pull-down circuit 1710 pulls down the reference voltage VREF1 during the transition period of the output voltage VOUT1 from dropping to rising to generate the reference voltage VREF2. The partial time pull-down circuit 1710 is coupled to the comparator 122 to provide the reference voltage VREF2.

Figure 18:
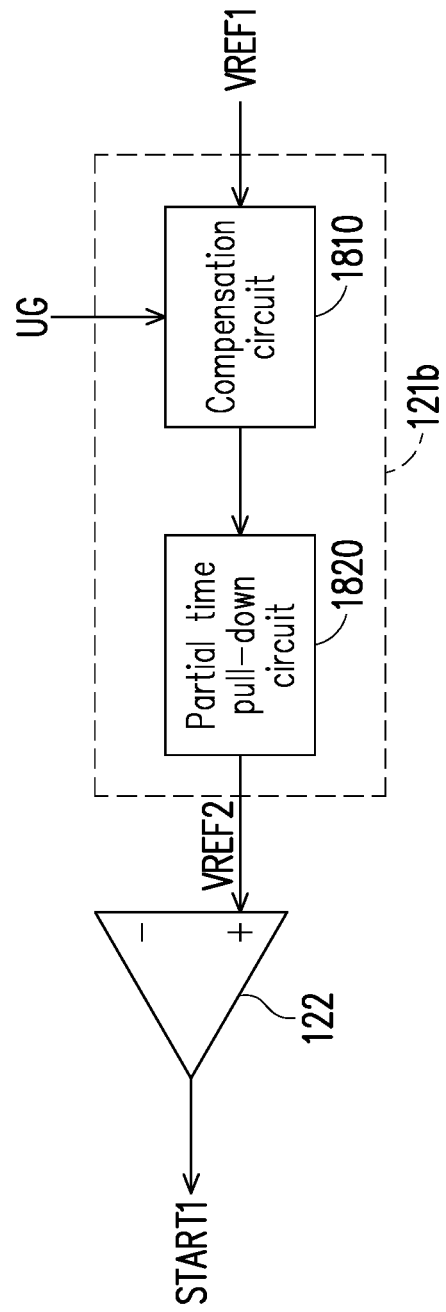
FIG. 18 is a circuit block schematic view of a VREF enhancing circuit according to yet another embodiment of the disclosure.

FIG. 18 is a circuit block schematic view of a VREF enhancing circuit 121b according to yet another embodiment of the disclosure. The VREF enhancing circuit 121b shown in FIG. 18 may be used as one of the embodiments of the VREF enhancing circuit 121b shown in FIG. 9 or 10. In the embodiment shown in FIG. 18, the VREF enhancing circuit 121b includes a compensation circuit 1810 and a partial time pull-down circuit 1820. An input terminal of the compensation circuit 1810 is coupled to the DC-to-DC converter 110 to receive the switch signal UG. The compensation circuit 1810 further receives the reference voltage VREF1 (original reference voltage). The compensation circuit 1810 compensates the reference voltage VREF1 based on the switch signal UG to generate the reference voltage VREF2. A pull-down terminal of the partial time pull-down circuit 1820 is coupled to the compensation circuit 1810 to receive the reference voltage VREF2. The partial time pull-down circuit 1820 pulls down the reference voltage VREF2 during the transition period of the output voltage VOUT1 from dropping to rising. The partial time pull-down circuit 1820 is coupled to the comparator 122 to provide the reference voltage VREF2.

Figure 19:
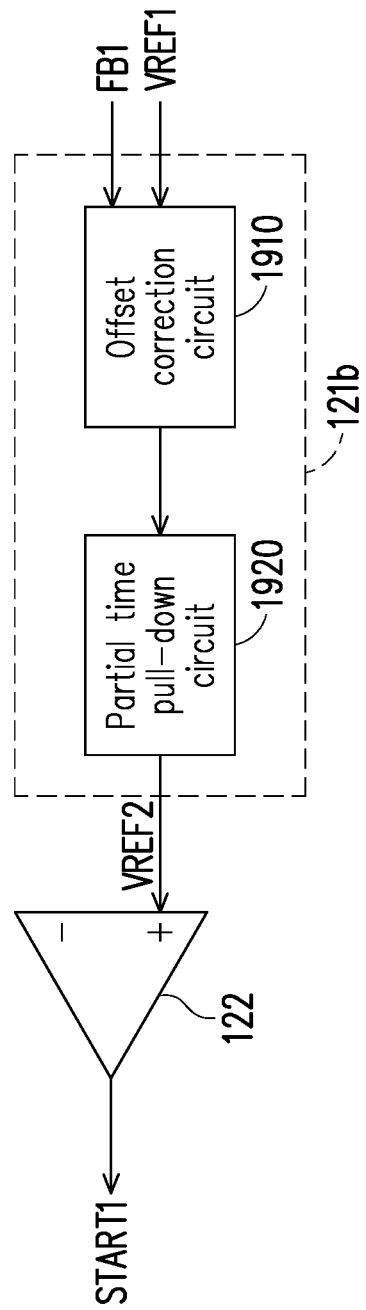
FIG. 19 is a circuit block schematic view of a VREF enhancing circuit according to another embodiment of the disclosure.

FIG. 19 is a circuit block schematic view of a VREF enhancing circuit 121b according to another embodiment of the disclosure. The VREF enhancing circuit 121b shown in FIG. 19 may be used as one of the embodiments of the VREF enhancing circuit 121b shown in FIG. 9 or 10. In the embodiment shown in FIG. 19, the VREF enhancing circuit 121b includes an offset correction circuit 1910 and a partial time pull-down circuit 1920. A first input terminal of the offset correction circuit 1910 is coupled to the DC-to-DC converter 110 to receive the feedback voltage FB1 corresponding to the output voltage VOUT1. A second input terminal of the offset correction circuit 1910 receives the reference voltage VREF1 (original reference voltage). The offset correction circuit 1910 may filter out an alternating current component of a difference between the feedback voltage FB1 and the reference voltage VREF1 to generate a difference voltage. The offset correction circuit 1910 converts the difference voltage into a difference current. The offset correction circuit 1910 adjusts the reference voltage VREF1 based on the difference current to generate the reference voltage VREF2. A pull-down terminal of the partial time pull-down circuit 1920 is coupled to the offset correction circuit 1910 to receive the reference voltage VREF2. The partial time pull-down circuit 1920 pulls down the reference voltage VREF2 during the transition period of the output voltage VOUT1 from dropping to rising. The partial time pull-down circuit 1920 is coupled to the comparator 122 to provide the reference voltage VREF2.

Figure 20:
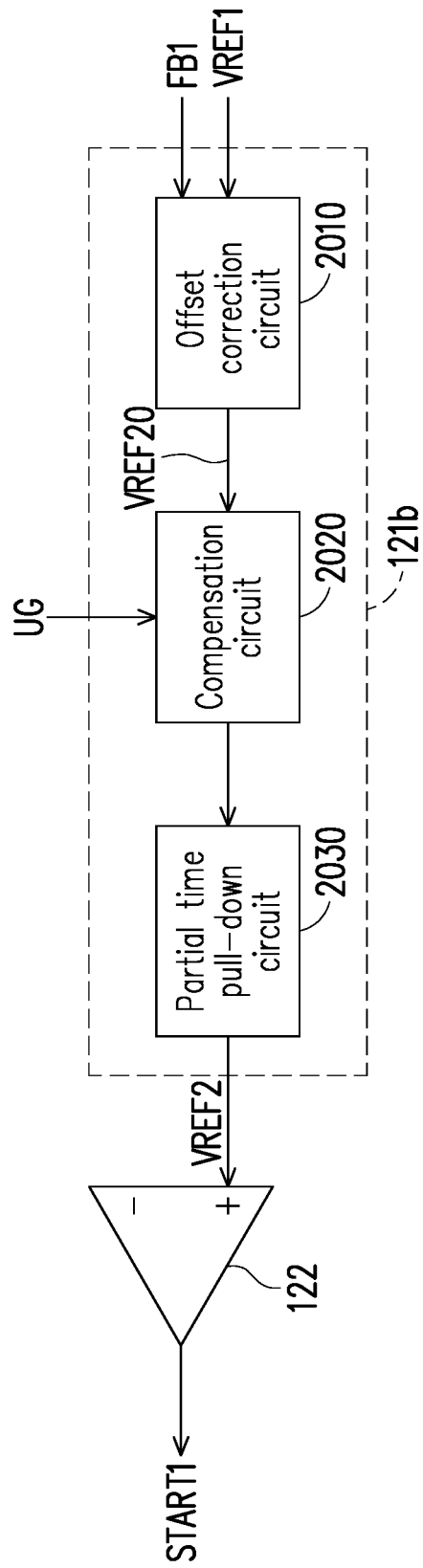
FIG. 20 is a circuit block schematic view of a VREF enhancing circuit according to another embodiment of the disclosure.

FIG. 20 is a circuit block schematic view of a VREF enhancing circuit 121b according to another embodiment of the disclosure. The VREF enhancing circuit 121b shown in FIG. 20 may be used as one of the embodiments of the VREF enhancing circuit 121b shown in FIG. 9 or 10. In the embodiment shown in FIG. 20, the VREF enhancing circuit 121b includes an offset correction circuit 2010, a compensation circuit 2020, and a partial time pull-down circuit 2030. A first input terminal of the offset correction circuit 2010 is coupled to the DC-to-DC converter 110 to receive the feedback voltage FB1 corresponding to the output voltage VOUT1. A second input terminal of the offset correction circuit 2010 receives the reference voltage VREF1 (original reference voltage). The offset correction circuit 2010 may filter out an alternating current component of a difference between the feedback voltage FB1 and the reference voltage VREF1 to generate a difference voltage. The offset correction circuit 2010 converts the difference voltage into a difference current. The offset correction circuit 2010 adjusts the reference voltage VREF1 based on the difference current to generate a corrected reference voltage VREF20. An input terminal of the compensation circuit 2020 is coupled to the DC-to-DC converter 110 to receive the switch signal UG. The compensation circuit 2020 is further coupled to the offset correction circuit 2010 to receive the corrected reference voltage VREF20. The compensation circuit 2020 compensates the corrected reference voltage VREF20 based on the switch signal UG to generate the reference voltage VREF2. A pull-down terminal of the partial time pull-down circuit 2030 is coupled to the compensation circuit 2020 to receive the reference voltage VREF2. The partial time pull-down circuit 2030 pulls down the reference voltage VREF2 during the transition period of the output voltage VOUT1 from dropping to rising. The partial time pull-down circuit 2030 is coupled to the comparator 122 to provide the reference voltage VREF2.

Figure 21:
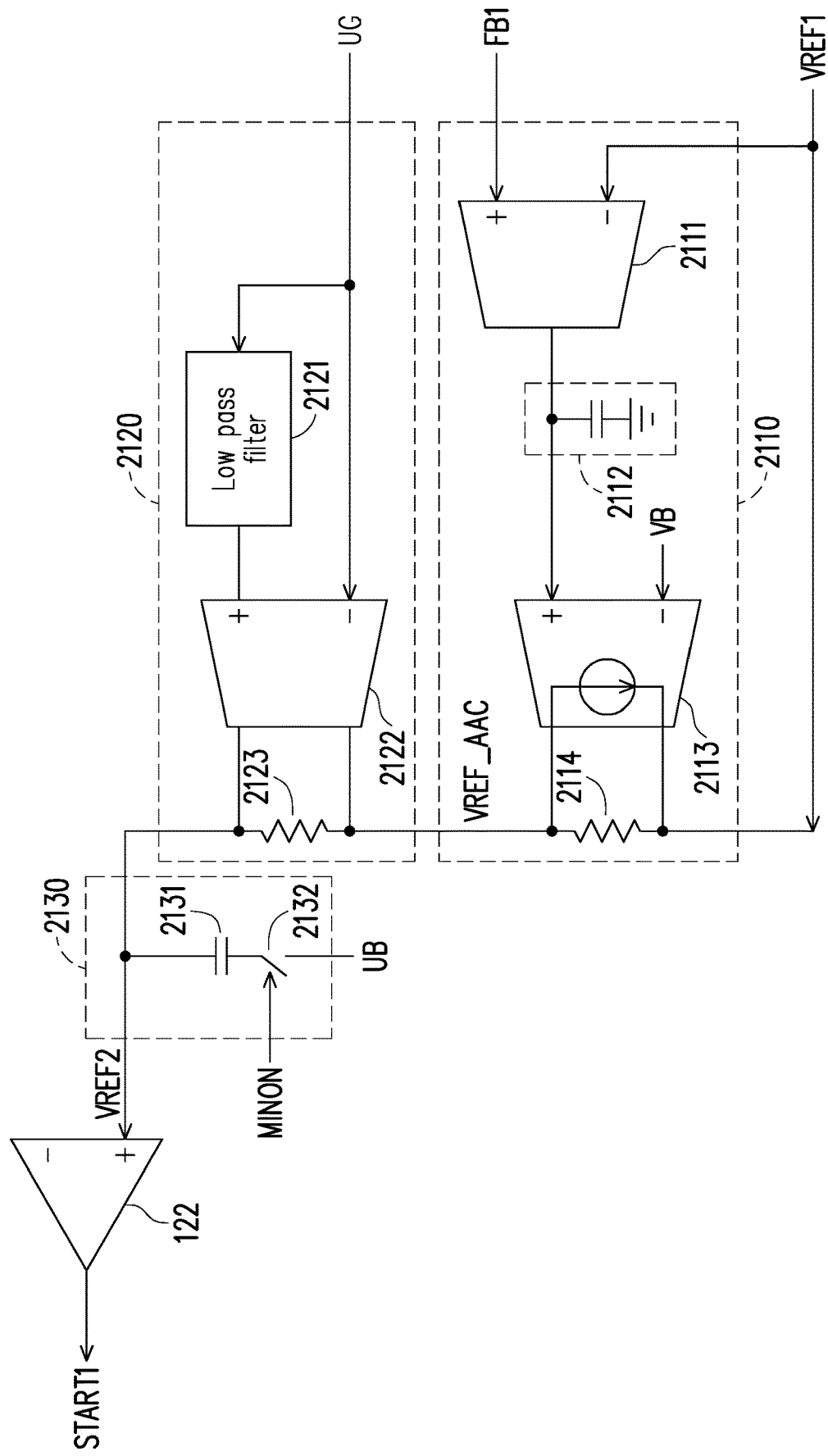
FIG. 21 is a circuit block schematic view of an offset correction circuit, a compensation circuit, and a partial time pull-down circuit according to an embodiment of the disclosure.

FIG. 21 is a circuit block schematic view of an offset correction circuit 2110, a compensation circuit 2120, and a partial time pull-down circuit 2130 according to an embodiment of the disclosure. The offset correction circuit 2110 shown in FIG. 21 may be used as one of the embodiments of the offset correction circuit 1510 shown in FIG. 15, the offset correction circuit 1610 shown in FIG. 16, the offset correction circuit 1910 shown in FIG. 19, or the offset correction circuit 2010 shown in FIG. 20.

Figure 22:
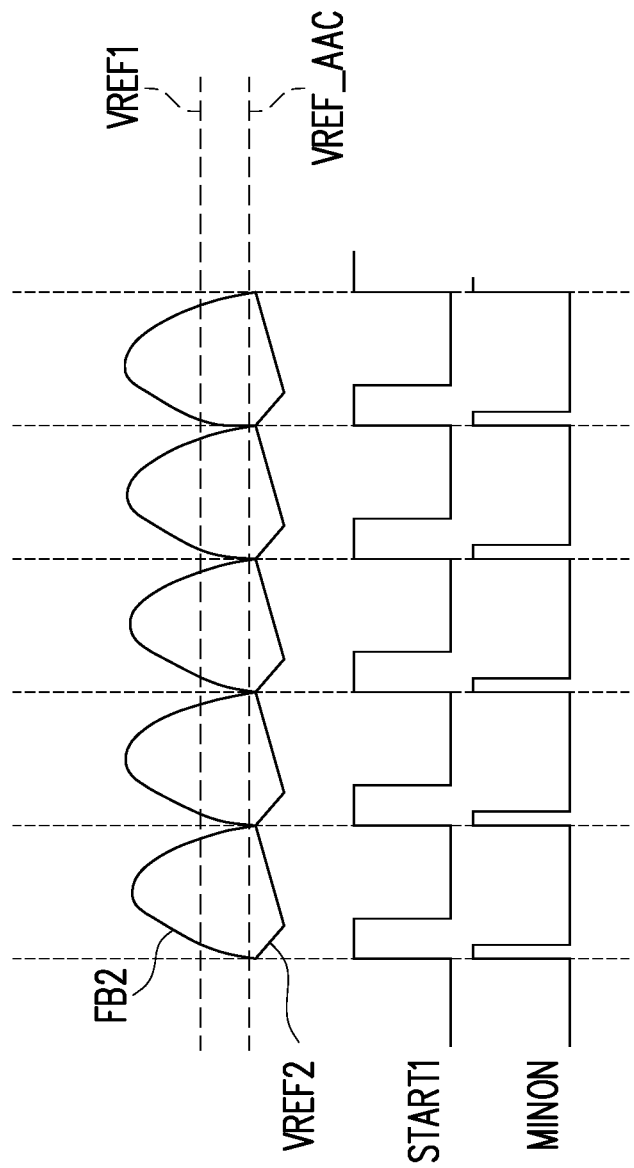
FIG. 22 is a signal waveform schematic view of a feedback voltage, an original reference voltage, a corrected reference voltage, an enhanced reference voltage, a control signal, and a switch signal according to another embodiment of the disclosure.

FIG. 22 is a signal waveform schematic view of the feedback voltage FB2, the reference voltage VREF1 (original reference voltage), a corrected reference voltage VREF_AAC, the reference voltage VREF2 (enhanced reference voltage), the control signal START1, and the switch signal MINON according to another embodiment of the disclosure. The horizontal axis shown in FIG. 22 represents time. The signal waveforms of the feedback voltage FB2, the reference voltage VREF1, the corrected reference voltage VREF_AAC, the reference voltage VREF2, the control signal START1, and the switch signal MINON shown in FIG. 22 may be used as the horizontal axis shown in FIG. 22 to represent time. One of the examples of the feedback voltage FB2, the reference voltage VREF1, the corrected reference voltage VREF_AAC, the reference voltage VREF2, the control signal START1, and the switch signal MINON is shown in FIG. 21.

Referring to FIG. 21 and FIG. 22, in the embodiment shown in FIG. 21, the offset correction circuit 2110 includes an amplifier circuit 2111, a low pass filter 2112, a transconductance amplifier 2113, and a resistor 2114. A first input terminal (e.g., the inverting input terminal) of the amplifier circuit 2111 receives the reference voltage VREF1. A second input terminal (e.g., the non-inverting input terminal) of the amplifier circuit 2111 is coupled to the DC-to-DC converter 110 to receive the feedback voltage FB1 corresponding to the output voltage VOUT1. According to the actual design, the amplifier circuit 2111 may be any amplifier circuit, such as an operational amplifier, a transconductance amplifier, or other amplifier circuits. The amplifier circuit 2111 may output the difference between the feedback voltage FB1 and the reference voltage VREF1 to the low pass filter 2112.

An input terminal of the low pass filter 2112 is coupled to an output terminal of the amplifier circuit 2111 to receive the difference between the feedback voltage FB1 and the reference voltage VREF1. In the embodiment shown in FIG. 21, the low pass filter 2112 includes a capacitor, but the implementation of the low pass filter 2112 is not limited thereto. According to the actual design, the low pass filter 2112 may be any low pass filter circuit. The low pass filter 2112 may filter out an alternating current component (frequency component) of a difference between the feedback voltage FB1 and the reference voltage VREF1, and transmit a direct current component (difference voltage) between the feedback voltage FB1 and the reference voltage VREF1 to the transconductance amplifier 2113.

A first input terminal (e.g., the inverting input terminal) of the transconductance amplifier 2113 is configured to receive a reference voltage VB (bias voltage). The level of the reference voltage VB may be determined according to the actual design. For example, the level of the reference voltage VB may be 1 volt or other DC voltage levels. A second input terminal (e.g., the non-inverting input terminal) of the transconductance amplifier 2113 is coupled to an output terminal of the low pass filter 2112 to receive the difference voltage. The transconductance amplifier 2113 may convert the difference voltage into a difference current.

A first terminal and a second terminal of the resistor 2114 is respectively coupled to a first current terminal and a second current terminal of the transconductance amplifier 2113 to receive the difference current. The first terminal of the resistor 2114 receives the reference voltage VREF1. The second terminal of the resistor 2114 is coupled to the comparator 122. Thus, the resistor 2114 may adjust the reference voltage VREF1 based on the difference current of the transconductance amplifier 2113 to generate a corrected reference voltage VREF_AAC to the next stage circuit (e.g., the compensation circuit 2120). On this basis, the transconductance amplifier 2113 and the resistor 2114 may adjust the corrected reference voltage VREF_AAC, so that the reference voltage VREF1 is eventually equal to a DC level (or an average level) of the feedback voltage FB1, thereby achieving better output voltage accuracy.

The compensation circuit 2120 shown in FIG. 21 may be used as one of the embodiments of the compensation circuit 1620 shown in FIG. 16, the compensation circuit 1810 shown in FIG. 18, or the compensation circuit 2020 shown in FIG. 20. In the embodiment shown in FIG. 21, the compensation circuit 2120 includes a low pass filter 2121, a transconductance amplifier 2122, and a resistor 2123. An input terminal of the low pass filter 2121 is coupled to the DC-to-DC converter 110 to receive the switch signal UG. A first input terminal (e.g., the inverting input terminal) of the transconductance amplifier 2122 is coupled to the DC-to-DC converter 110 to receive the switch signal UG. A second input terminal (e.g., the non-inverting input terminal) of the transconductance amplifier 2122 is coupled to the output terminal of the low pass filter 2121. A first terminal and a second terminal of the resistor 2123 is respectively coupled to a first current terminal and a second current terminal of the transconductance amplifier 2122. The first terminal of the resistor 2123 is coupled to the offset correction circuit 2110 to receive the corrected reference voltage VREF_AAC. The second terminal of the resistor 2123 is coupled to the comparator 122. Thus, the resistor 2123 may generate a compensated reference voltage to the next stage circuit (e.g., the partial time pull-down circuit 2130) based on the voltage of the previous stage circuit of the transconductance amplifier 2122 (e.g., the corrected reference voltage VREF_AAC output by the offset correction circuit 2110).

The partial time pull-down circuit 2130 shown in FIG. 21 may be used as one of the embodiments of the partial time pull-down circuit 1710 shown in FIG. 17, the partial time pull-down circuit 1820 shown in FIG. 18, the partial time pull-down circuit 1920 shown in FIG. 19, or the partial time pull-down circuit 2030 shown in FIG. 20. In the embodiment shown in FIG. 21, the partial time pull-down circuit 2130 includes a capacitor 2131 and a switch 2132. The first terminal of the capacitor 2131 is coupled to a pull-down terminal of the partial time pull-down circuit 2130 to temporarily pull down the voltage of the previous stage circuit (e.g., the compensated reference voltage output by the compensation circuit 2120). A first terminal of the switch 2132 is coupled to a second terminal of the capacitor 2131. A second terminal of the switch 2132 is coupled to the DC-to-DC converter 110 to receive a pull-down voltage UB (e.g., an inverted signal of the control signal U shown in FIG. 8). The pull-down voltage UB may be provided by the latch of the COT control circuit 111.

A control terminal of the switch 1422 is coupled to the DC-to-DC converter 110 to receive a switch signal MINON. A pulse width of the switch signal MINON is the lower limit of the conduction time of the upper power switch SWU (minimum turned-on period). The timer of the COT control circuit 111 may generate the switch signal MINON to the switch 1422. Based on the switch signal MINON, the switch 2132 is turned on during the minimum turned-on period including "a turning time point of the output voltage VOUT1 from dropping to rising". The switch 2132 is turned off during other periods except for the minimum turned-on period. Thus, the partial time pull-down circuit 2130 may pull down the reference voltage VREF2 during the transition period of the output voltage VOUT1 from dropping to rising.

Based on the above, the amplifier circuit 2111 and the low pass filter 2112 are disposed in the offset correction circuit 2110. The amplifier circuit 2111 and the low pass filter 2112 may filter the low frequency signal into an approximate direct current (DC) signal, so as to avoid the sine wave oscillation caused by low frequency. The transconductance amplifier 2113 compares the filtering result with the reference voltage VB (bias voltage). In response to the load being light, the switching frequency of the COT converter (the DC-to-DC converter 110) is a low switching frequency (e.g., less than 1 KHz). The offset correction circuit 2110 is more suitable for COT light load with high efficiency and low switching frequency. The transconductance amplifier 2113 and the resistor 2114 may eliminate the offset caused on the circuit and/or signal. The offset may include: a signal offset of the feedback voltage FB2, a signal offset of the reference voltage VREF2, and/or an offset of the comparator 122. After the control signal START1 output by the comparator 122 transits to a high logic level, the partial time pull-down circuit 2130 uses the coupling characteristics of the capacitor to quickly pull down the reference voltage VREF2 to allow the control signal START1 output by the comparator to quickly recover to a low logic level. Thus, the enhancing circuit 121 may strengthen the reference signal VREF2 of the COT comparator 122, thereby making the output voltage VOUT1 more accurate and stable.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A feedback control device, configured to generate a control signal to a DC-to-DC converter based on an output voltage of the DC-to-DC converter, wherein the feedback control device comprises:
   an enhancing circuit, coupled to the DC-to-DC converter to receive a first feedback voltage corresponding to the output voltage, and configured to generate a second feedback voltage based on the first feedback voltage; and
   a comparator, coupled to the enhancing circuit to receive a first reference voltage and the second feedback voltage, wherein the comparator generates a comparison result based on the first reference voltage and the second feedback voltage as the control signal to a feedback control terminal of the DC-to-DC converter, wherein,
   the enhancing circuit amplifies the first feedback voltage to generate an amplified voltage and pulls up the amplified voltage during the transition period of the output voltage to generate the second feedback voltage, wherein the enhancing circuit comprises:
      a partial time pull-up circuit, having a pull-up terminal receiving a voltage corresponding to the first feedback voltage, wherein the partial time pull-up circuit pulls up the voltage corresponding to the first feedback voltage during the transition period of the output voltage and does not pull up at other time, so as to generate the second feedback voltage to the comparator.

2. The feedback control device according to claim 1, wherein the DC-to-DC converter is a constant ON time type DC-to-DC converter.

3. The feedback control device according to claim 1, wherein the enhancing circuit comprises:
   an amplifier circuit, having an input terminal coupled to the DC-to-DC converter to receive the first feedback voltage corresponding to the output voltage, wherein the amplifier circuit amplifies the first feedback voltage to generate the second feedback voltage, and an output terminal of the amplifier circuit is coupled to the comparator to provide the second feedback voltage.

4. The feedback control device according to claim 3, wherein the amplifier circuit comprises:
   a low pass filter, having an input terminal coupled to the input terminal of the amplifier circuit;
   a first resistor, having a first terminal coupled to an output terminal of the low pass filter;
   an operational amplifier, having a first input terminal coupled to a second terminal of the first resistor, wherein a second input terminal of the operational amplifier is coupled to the input terminal of the amplifier circuit, and an output terminal of the operational amplifier is coupled to the output terminal of the amplifier circuit; and
   a second resistor, having a first terminal and a second terminal respectively coupled to the first input terminal and the output terminal of the operational amplifier.

5. The feedback control device according to claim 1, wherein
   the pull-up terminal of the partial time pull-up circuit is coupled to the DC-to-DC converter to receive the first feedback voltage corresponding to the output voltage, and the partial time pull-up circuit pulls up the first feedback voltage during the transition period of the output voltage and does not pull up at other time, so as to generate the second feedback voltage to the comparator.

6. The feedback control device according to claim 5, wherein the partial time pull-up circuit comprises:
   a capacitor, having a first terminal coupled to the pull-up terminal of the partial time pull-up circuit; and
   a switch, having a first terminal coupled to a second terminal of the capacitor, wherein a second terminal of the switch is coupled to the DC-to-DC converter to receive a pull-up voltage, the switch is turned on during a minimum turned-on period comprising a turning time point of the output voltage from dropping to rising, and the switch is turned off during other periods except for the minimum turned-on period.

7. The feedback control device according to claim 1, wherein the enhancing circuit comprises:
an amplifier circuit, having an input terminal coupled to the DC-to-DC converter to receive the first feedback voltage corresponding to the output voltage, wherein the amplifier circuit amplifies the first feedback voltage to generate the amplified voltage; and
the partial time pull-up circuit, coupled to an output terminal of the amplifier circuit to receive the amplified voltage, wherein the partial time pull-up circuit pulls up the amplified voltage during the transition period of the output voltage and does not pull up at other time, so as to generate the second feedback voltage to the comparator.

8. The feedback control device according to claim 1, wherein,
the enhancing circuit filters out an alternating current component of a difference between the first feedback voltage and a second reference voltage to generate a difference voltage, converts the difference voltage into a difference current, and adjusts the second reference voltage based on the difference current to generate the first reference voltage; or
the enhancing circuit pulls down the second reference voltage during the transition period of the output voltage from dropping to rising to generate the first reference voltage; or
the enhancing circuit filters out the alternating current component of the difference between the first feedback voltage and the second reference voltage to generate the difference voltage, converts the difference voltage into the difference current, adjusts the second reference voltage based on the difference current to generate the first reference voltage, and pulls down the first reference voltage during the transition period of the output voltage.

9. The feedback control device according to claim 1, wherein the enhancing circuit comprises:
an offset correction circuit, having a first input terminal coupled to the DC-to-DC converter to receive the first feedback voltage corresponding to the output voltage, wherein a second input terminal of the offset correction circuit receives a second reference voltage, the offset correction circuit filters out an alternating current component of a difference between the first feedback voltage and the second reference voltage to generate a difference voltage, the offset correction circuit converts the difference voltage into a difference current, the offset correction circuit adjusts the second reference voltage based on the difference current to generate the first reference voltage, and an output terminal of the offset correction circuit is coupled to the comparator to provide the first reference voltage.

10. The feedback control device according to claim 9, wherein the offset correction circuit comprises:
an amplifier circuit, having a first input terminal to receive the second reference voltage, wherein a second input terminal of the amplifier circuit is coupled to the DC-to-DC converter to receive the first feedback voltage corresponding to the output voltage;
a low pass filter, having an input terminal coupled to an output terminal of the amplifier circuit to receive the difference between the first feedback voltage and the second reference voltage;
a transconductance amplifier, having a first input terminal to receive a third reference voltage, wherein a second input terminal of the transconductance amplifier is coupled to an output terminal of the low pass filter to receive the difference voltage; and
a resistor, having a first terminal and a second terminal respectively coupled to a first current terminal and a second current terminal of the transconductance amplifier to receive the difference current, wherein the first terminal of the resistor receives the second reference voltage, and the second terminal of the resistor is coupled to the comparator.

11. The feedback control device according to claim 1, wherein the enhancing circuit comprises:
an offset correction circuit, having a first input terminal coupled to the DC-to-DC converter to receive the first feedback voltage corresponding to the output voltage, wherein a second input terminal of the offset correction circuit receives a second reference voltage, the offset correction circuit filters out an alternating current component of a difference between the first feedback voltage and the second reference voltage to generate a difference voltage, the offset correction circuit converts the difference voltage into a difference current, and the offset correction circuit adjusts the second reference voltage based on the difference current to generate a corrected reference voltage; and
a compensation circuit, coupled to the offset correction circuit to receive the corrected reference voltage, wherein the compensation circuit compensates the corrected reference voltage based on a switch signal of the DC-to-DC converter to generate the first reference voltage, and an output terminal of the compensation circuit is coupled to the comparator to provide the first reference voltage.

12. The feedback control device according to claim 1, wherein the enhancing circuit comprises:
a partial time pull-down circuit, having a pull-down terminal to receive a second reference voltage, wherein the partial time pull-down circuit pulls down the second reference voltage during the transition period of the output voltage from dropping to rising to generate the first reference voltage, and the partial time pull-down circuit is coupled to the comparator to provide the first reference voltage.

13. The feedback control device according to claim 12, wherein the partial time pull-down circuit comprises:
a capacitor, having a first terminal coupled to the pull-down terminal of the partial time pull-down circuit; and
a switch, having a first terminal coupled to a second terminal of the capacitor, wherein a second terminal of the switch is coupled to the DC-to-DC converter to receive a pull-down voltage, the switch is turned on during a minimum turned-on period comprising a turning time point of the output voltage from dropping to rising, and the switch is turned off during other periods except for the minimum turned-on period.

14. The feedback control device according to claim 1, wherein the enhancing circuit comprises:
a compensation circuit, having an input terminal coupled to the DC-to-DC converter to receive a switch signal, wherein the compensation circuit further receives a second reference voltage, and the compensation circuit compensates the second reference voltage based on the switch signal to generate the first reference voltage; and a partial time pull-down circuit, having a pull-down terminal coupled to the compensation circuit to receive the first reference voltage, wherein the partial time pull-down circuit pulls down the first reference voltage during the transition period of the output voltage from dropping to rising, and the partial time pull-down circuit is coupled to the comparator to provide the first reference voltage.

15. The feedback control device according to claim 1, wherein the enhancing circuit comprises:

an offset correction circuit, having a first input terminal coupled to the DC-to-DC converter to receive the first feedback voltage corresponding to the output voltage, wherein a second input terminal of the offset correction circuit receives a second reference voltage, the offset correction circuit filters out an alternating current component of a difference between the first feedback voltage and the second reference voltage to generate a difference voltage, the offset correction circuit converts the difference voltage into a difference current, and the offset correction circuit adjusts the second reference voltage based on the difference current to generate the first reference voltage; and a partial time pull-down circuit, having a pull-down terminal coupled to the offset correction circuit to receive the first reference voltage, wherein the partial time pull-down circuit pulls down the first reference voltage during the transition period of the output voltage from dropping to rising, and the partial time pull-down circuit is coupled to the comparator to provide the first reference voltage.

16. The feedback control device according to claim 1, wherein the enhancing circuit comprises:

an offset correction circuit, having a first input terminal coupled to the DC-to-DC converter to receive the first feedback voltage corresponding to the output voltage, wherein a second input terminal of the offset correction circuit receives a second reference voltage, the offset correction circuit filters out an alternating current component of a difference between the first feedback voltage and the second reference voltage to generate a difference voltage, the offset correction circuit converts the difference voltage into a difference current, and the offset correction circuit adjusts the second reference voltage based on the difference current to generate a corrected reference voltage;

a compensation circuit, having an input terminal coupled to the DC-to-DC converter to receive a switch signal, wherein the compensation circuit is further coupled to the offset correction circuit to receive the corrected reference voltage, and the compensation circuit compensates the corrected reference voltage based on the switch signal to generate the first reference voltage; and a partial time pull-down circuit, coupled to the compensation circuit to receive the first reference voltage, wherein the partial time pull-down circuit pulls down the first reference voltage during the transition period of the output voltage from dropping to rising, and the partial time pull-down circuit is coupled to the comparator to provide the first reference voltage.

17. A feedback control device, configured to generate a control signal to a DC-to-DC converter based on an output voltage of the DC-to-DC converter, wherein the feedback control device comprises:

an enhancing circuit, coupled to the DC-to-DC converter to receive a feedback voltage corresponding to the output voltage, and configured to generate a second reference voltage based on the feedback voltage and a first reference voltage; and a comparator, coupled to the enhancing circuit to receive the second reference voltage, wherein the comparator generates a comparison result based on the second reference voltage and the feedback voltage as the control signal to a feedback control terminal of the DC-to-DC converter, wherein, the enhancing circuit filters out an alternating current component of a difference between the feedback voltage and the first reference voltage to generate a difference voltage, converts the difference voltage into a difference current, and adjusts the first reference voltage based on the difference current to generate the second reference voltage; or the enhancing circuit pulls down the first reference voltage during a transition period of the output voltage from dropping to rising to generate the second reference voltage; or the enhancing circuit filters out the alternating current component of the difference between the feedback voltage and the first reference voltage to generate the difference voltage, converts the difference voltage into the difference current, adjusts the first reference voltage based on the difference current to generate the second reference voltage, and pulls down the second reference voltage during the transition period of the output voltage.

18. The feedback control device according to claim 17, wherein the DC-to-DC converter is a constant ON time type DC-to-DC converter.

19. The feedback control device according to claim 17, wherein the enhancing circuit comprises:

an offset correction circuit, having a first input terminal coupled to the DC-to-DC converter to receive the feedback voltage corresponding to the output voltage, wherein a second input terminal of the offset correction circuit receives the first reference voltage, the offset correction circuit filters out the alternating current component of the difference between the feedback voltage and the first reference voltage to generate the difference voltage, the offset correction circuit converts the difference voltage into the difference current, the offset correction circuit adjusts the first reference voltage based on the difference current to generate the second reference voltage, and an output terminal of the offset correction circuit is coupled to the comparator to provide the second reference voltage.

20. The feedback control device according to claim 19, wherein the offset correction circuit comprises:

an amplifier circuit, having a first input terminal to receive the first reference voltage, wherein a second input terminal of the amplifier circuit is coupled to the DC-to-DC converter to receive the feedback voltage corresponding to the output voltage;

a low pass filter, having an input terminal coupled to an output terminal of the amplifier circuit to receive the difference between the feedback voltage and the first reference voltage;

a transconductance amplifier, having a first input terminal to receive a third reference voltage, wherein a second input terminal of the transconductance amplifier is coupled to an output terminal of the low pass filter to receive the difference voltage; and a resistor, having a first terminal and a second terminal respectively coupled to a first current terminal and a second current terminal of the transconductance amplifier to receive the difference current, wherein the first terminal of the resistor receives the first reference voltage, and the second terminal of the resistor is coupled to the comparator.

21. The feedback control device according to claim 17, wherein the enhancing circuit comprises:
an offset correction circuit, having a first input terminal coupled to the DC-to-DC converter to receive the feedback voltage corresponding to the output voltage, wherein a second input terminal of the offset correction circuit receives the first reference voltage, the offset correction circuit filters out the alternating current component of the difference between the feedback voltage and the first reference voltage to generate the difference voltage, the offset correction circuit converts the difference voltage into the difference current, and the offset correction circuit adjusts the first reference voltage based on the difference current to generate a corrected reference voltage; and
a compensation circuit, coupled to the offset correction circuit to receive the corrected reference voltage, wherein the compensation circuit compensates the corrected reference voltage based on a switch signal of the DC-to-DC converter to generate the second reference voltage, and an output terminal of the compensation circuit is coupled to the comparator to provide the second reference voltage.

22. The feedback control device according to claim 17, wherein the enhancing circuit comprises:
a partial time pull-down circuit, having a pull-down terminal to receive the first reference voltage, wherein the partial time pull-down circuit pulls down the first reference voltage during the transition period of the output voltage from dropping to rising to generate the second reference voltage, and the partial time pull-down circuit is coupled to the comparator to provide the second reference voltage.

23. The feedback control device according to claim 22, wherein the partial time pull-down circuit comprises:
a capacitor, having a first terminal coupled to the pull-down terminal of the partial time pull-down circuit; and
a switch, having a first terminal coupled to a second terminal of the capacitor, wherein a second terminal of the switch is coupled to the DC-to-DC converter to receive a pull-down voltage, the switch is turned on during a minimum turned-on period comprising a turning time point of the output voltage from dropping to rising, and the switch is turned off during other periods except for the minimum turned-on period.

24. The feedback control device according to claim 17, wherein the enhancing circuit comprises:
a compensation circuit, having an input terminal coupled to the DC-to-DC converter to receive a switch signal, wherein the compensation circuit further receives the first reference voltage, and the compensation circuit compensates the first reference voltage based on the switch signal to generate the second reference voltage; and
a partial time pull-down circuit, having a pull-down terminal coupled to the compensation circuit to receive the second reference voltage, wherein the partial time pull-down circuit pulls down the second reference voltage during the transition period of the output voltage from dropping to rising, and the partial time pull-down circuit is coupled to the comparator to provide the second reference voltage.

25. The feedback control device according to claim 17, wherein the enhancing circuit comprises:
an offset correction circuit, having a first input terminal coupled to the DC-to-DC converter to receive the feedback voltage corresponding to the output voltage, wherein a second input terminal of the offset correction circuit receives the first reference voltage, the offset correction circuit filters out the alternating current component of the difference between the feedback voltage and the first reference voltage to generate the difference voltage, the offset correction circuit converts the difference voltage into the difference current, and the offset correction circuit adjusts the first reference voltage based on the difference current to generate the second reference voltage, and
a partial time pull-down circuit, having a pull-down terminal coupled to the offset correction circuit to receive the second reference voltage, wherein the partial time pull-down circuit pulls down the second reference voltage during the transition period of the output voltage from dropping to rising, and the partial time pull-down circuit is coupled to the comparator to provide the second reference voltage.

26. The feedback control device according to claim 17, wherein the enhancing circuit comprises:
an offset correction circuit, having a first input terminal coupled to the DC-to-DC converter to receive the feedback voltage corresponding to the output voltage, wherein a second input terminal of the offset correction circuit receives the first reference voltage, the offset correction circuit filters out the alternating current component of the difference between the feedback voltage and the first reference voltage to generate the difference voltage, the offset correction circuit converts the difference voltage into the difference current, and the offset correction circuit adjusts the first reference voltage based on the difference current to generate a corrected reference voltage;
a compensation circuit, having an input terminal coupled to the DC-to-DC converter to receive a switch signal, wherein the compensation circuit is further coupled to the offset correction circuit to receive the corrected reference voltage, and the compensation circuit compensates the corrected reference voltage based on the switch signal to generate the second reference voltage; and
a partial time pull-down circuit, coupled to the compensation circuit to receive the second reference voltage, wherein the partial time pull-down circuit pulls down the second reference voltage during the transition period of the output voltage from dropping to rising, and the partial time pull-down circuit is coupled to the comparator to provide the second reference voltage.

27. A feedback control method, generating a control signal to a DC-to-DC converter based on an output voltage of the DC-to-DC converter, wherein the feedback control method comprises:
generating a second reference voltage by an enhancing circuit based on a feedback voltage corresponding to the output voltage and a first reference voltage; and
generating a comparison result by a comparator based on the second reference voltage and the feedback voltage as the control signal to a feedback control terminal of the DC-to-DC converter, wherein, the enhancing circuit filters out an alternating current component of a difference between the feedback voltage and the first reference voltage to generate a difference voltage, converts the difference voltage into a difference current, and adjusts the first reference voltage based on the difference current to generate the second reference voltage; or the enhancing circuit pulls down the first reference voltage during a transition period of the output voltage from dropping to rising to generate the second reference voltage; or the enhancing circuit filters out the alternating current component of the difference between the feedback voltage and the first reference voltage to generate the difference voltage, converts the difference voltage into the difference current, adjusts the first reference voltage based on the difference current to generate the second reference voltage, and pulls down the second reference voltage during the transition period of the output voltage.

28. The feedback control method according to claim 27, wherein the DC-to-DC converter is a constant ON time type DC-to-DC converter.

\* \* \* \* \*